United States Patent
Kim et al.

(10) Patent No.: US 9,411,335 B2
(45) Date of Patent: Aug. 9, 2016

(54) METHOD AND APPARATUS TO PLAN MOTION PATH OF ROBOT

(75) Inventors: Myung Hee Kim, Suwon-si (KR); Kyung Shik Roh, Seongnam-si (KR); San Lim, Suwon-si (KR); Bok Man Lim, Seoul (KR); Guo Chunxu, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 561 days.

(21) Appl. No.: 12/805,270

(22) Filed: Jul. 21, 2010

(65) Prior Publication Data
US 2011/0035087 A1  Feb. 10, 2011

(30) Foreign Application Priority Data
Aug. 10, 2009  (KR) .............. 10-2009-73257

(51) Int. Cl.
| G05B 19/04 | (2006.01) |
| G05D 1/02 | (2006.01) |
| B25J 9/16 | (2006.01) |
| G05B 19/18 | (2006.01) |
| G06F 19/00 | (2011.01) |
| G06F 17/10 | (2006.01) |

(52) U.S. Cl.
CPC ............. G05D 1/0217 (2013.01); B25J 9/1666 (2013.01); G05D 1/0274 (2013.01); *G05D 2201/0216* (2013.01); *G05D 2201/0217* (2013.01)

(58) Field of Classification Search
CPC ................ B25J 9/1666; B25J 9/1664; G05B 2219/40421; G05B 2219/40444; G05B 2219/40445; G05B 2219/40446; G05B 2219/40458; G05B 2219/40463; G05B 2219/40476; G05B 2219/40488; G05B 2219/40497; G05B 2219/04
See application file for complete search history.

(56) References Cited

U.S. PATENT DOCUMENTS 4,772,831 A * 9/1988 Casler, Jr. ............ G05B 19/416
318/567
5,835,684 A * 11/1998 Bourne .................. B25J 9/1666
700/255

(Continued)

FOREIGN PATENT DOCUMENTS

JP  2008-105132 A  5/2008

OTHER PUBLICATIONS http://ieeexplore.ieee.org/stamp/stamp.jsp?tp=&arnumber=1641979.*

(Continued)

*Primary Examiner* — Ryan Zeender
*Assistant Examiner* — Dana Amsdell
(74) *Attorney, Agent, or Firm* — Harness, Dickey & Pierce, P.L.C.

(57) ABSTRACT

A suitable waypoint is selected using a goal score, a section from a start point to a goal point through the waypoint is divided into a plurality of sections based on the waypoint with a solution of inverse kinematics, and trees are simultaneously expanded in the sections using a Best First Search & Rapidly Random Tree (BF-RRT) algorithm so as to generate a path. By this configuration, a probability of local minima occurring is decreased compared with the case where the waypoint is randomly selected. In addition, since the trees are simultaneously expanded in the sections each having the waypoint with a solution of inverse kinematics, the solution may be rapidly obtained. A time consumed to search for an optimal motion path may be shortened and path plan performance may be improved.

4 Claims, 42 Drawing Sheets

(56) References Cited

U.S. PATENT DOCUMENTS

| | | | | |
|---|---|---|---|---|
| 5,999,881 | A * | 12/1999 | Law | G05B 19/4061 701/26 |
| 6,166,746 | A * | 12/2000 | Inada et al. | 345/474 |
| 6,493,607 | B1 * | 12/2002 | Bourne et al. | 700/255 |
| 6,728,581 | B1 * | 4/2004 | Trovato | B25J 9/1666 700/254 |
| 7,512,485 | B2 * | 3/2009 | Hudson, Jr. | G01C 21/00 342/357.31 |
| 7,844,398 | B2 * | 11/2010 | Sato | B25J 9/1666 700/213 |
| 8,185,265 | B2 * | 5/2012 | Nagano | B25J 9/1666 340/573.7 |
| 8,311,731 | B2 * | 11/2012 | Sugiura | B25J 9/1666 345/473 |
| 8,483,874 | B2 * | 7/2013 | Kim | B25J 9/1664 341/79 |
| 8,972,057 | B1 * | 3/2015 | Freeman | B25J 9/1666 700/246 |
| 2006/0190136 | A1 * | 8/2006 | Boyer | B25J 9/1664 700/245 |
| 2006/0241813 | A1 * | 10/2006 | Babu | G03B 27/32 700/255 |
| 2008/0306628 | A1 * | 12/2008 | Ng-Thow-Hing | B25J 9/1664 700/245 |
| 2010/0114338 | A1 * | 5/2010 | Bandyopadhyay | B23K 37/0258 700/36 |
| 2010/0121148 | A1 * | 5/2010 | Donhowe | A61B 1/00009 600/118 |
| 2010/0168950 | A1 * | 7/2010 | Nagano | B25J 9/1666 701/25 |
| 2011/0035050 | A1 * | 2/2011 | Kim | B25J 9/1666 700/246 |

OTHER PUBLICATIONS

Kuffner, Jr. et al. "RRT-Connect: An Efficient Approach to Single-Query Path Planning," *Proc. 2000 IEEE Int'l Conf. on Robotics and Automation (ICRA 2000)*. 2000.

Korean Office Action dated Dec. 18, 2015 for corresponding KR Application No. 10-2009-0073257.

* cited by examiner (a)   (b)

METHOD AND APPARATUS TO PLAN MOTION PATH OF ROBOT

CROSS-REFERENCE TO RELATED APPLICATIONS

This application claims the benefit of Korean Patent Application No. 2009-0073257, filed on Aug. 10, 2009 in the Korean Intellectual Property Office, the disclosure of which is incorporated herein by reference.

BACKGROUND

1. Field

Embodiments relate to a method and apparatus to plan a motion path of a robot, which is not obstructed by an obstacle in a working environment.

2. Description of the Related Art

In general, a mechanical device which performs motions similar to human motion using an electrical or magnetic mechanism is called a robot. Early robots included manipulators used for automated or unmanned tasks of manufacturing plants or industrial robots such as transportation robots, and performed dangerous tasks, simply repeated tasks or tasks using large force in place of a human. Recently, research into a humanoid robot which has joints similar to those of a human, coexists with a human in a working and living space of the human and provides various services has been actively conducted.

Such a humanoid robot performs tasks using a manipulator which may move similarly to the arm or hand motion of a human by an electrical or mechanical mechanism. In most manipulators which are currently being used, several links are connected to each other. A connection portion between the links is called a joint. The motion characteristics of the manipulator are determined according to a geometrical relationship. Mathematical representation of such a geometrical relationship is called kinematics. In general, the manipulator moves an end effector of a robot with such kinematic characteristics in a direction (goal point) to perform a task.

In order to allow the manipulator to perform a given task (e.g., grasp an object), it is important to generate a motion path from an initial position (start point) before the manipulator performs a task to a final position (goal point) where the task may be performed, that is, an object may be grasped. The path in which the manipulator may move from the start point to the goal point without colliding with an obstacle within a working area is automatically generated by an algorithm. The method of generating the path is divided into a process of searching for a free space which does not cause collision with an obstacle and a process of planning the motion path of the manipulator in the free space.

Hereinafter, in a sampling-based path planning algorithm which plans an optimal path to connect given start and goal points while satisfying constraints, such as obstacle avoidance, a method of using a Rapidly-exploring Random Tree (RRT) algorithm in a situation with a high degree of freedom or complicated constraints will be described.

The RRT algorithm is a method of repeating a process of selecting a closest node from an initial start point using a randomly sampled configuration in a Configuration Space (C-Space), in which the manipulator performs a task, so as to expand a tree, and searching for a motion path to a goal point. A node having a smallest goal score is selected from the tree using a goal function composed of a function of a distance from the goal point to an end-effector and a directional vector so as to expand the tree.

However, in the RRT algorithm of the related art, if a goal function is not accurately determined when the closest node is selected so as to expand the tree reaching the goal point, local minima occur and thus a solution may not be obtained. In addition, it takes considerable time to expand the tree. Even when escaping from local minima, the tree may be expanded in a wrong direction until local minima are recognized. Therefore, a speed to search for the solution may be decreased and thus a time consumed to search for a path may be increased.

SUMMARY

Therefore, it is an aspect of at least one embodiment to provide a method and apparatus to plan a motion path of a robot, which shortens a time consumed to expand a tree, minimizes the expansion of the tree in a wrong direction, and improves the performance of a path plan.

Additional aspects of the at least one embodiment will be set forth in part in the description which follows and, in part, will be obvious from the description, or may be learned by practice of the invention.

The foregoing and/or other aspects are achieved by providing a method of planning a path of a robot, the method including: forming a configuration space to generate a motion path of a manipulator using a processor; if there is an obstacle between a start point and a goal point of the configuration space, recognizing the obstacle as an intermediate point and selecting a waypoint having a smallest goal score from a plurality of waypoints located at the periphery of the intermediate point using the processor; dividing a section from the start point to the goal point into a plurality of sections based on the selected waypoint using the processor; determining whether a solution of inverse kinematics of the selected waypoint is present using the processor; simultaneously expanding trees with respect to sections each having a waypoint with a solution of inverse kinematics, and expanding a tree after the expansion of the trees is finished in the sections each having the waypoint with the solution of inverse kinematics, with respect to a section having a waypoint without a solution of inverse kinematics, so as to generate a search graph using the processor; and connecting the start point and the goal point using the search graph so as to generate an optimal path to avoid the obstacle using the processor.

The start point may be a node where a configuration at an initial position before the manipulator performs a task is formed in the configuration space.

The goal point may be a node where a configuration at a goal position where the manipulator performs a task is formed in the configuration space.

The intermediate point may be an obstacle located within a predetermined angle from a straight line connected between the start point and the goal point.

The selecting of the waypoint may include selecting certain points separated from the intermediate point by predetermined distances, respectively connecting the certain points to the start point and the goal point, and selecting a certain point, in which the obstacle is not present, as the waypoint.

The foregoing and/or other aspects are achieved by providing an apparatus to plan a motion path of a robot, the apparatus including: a recognizer using a processor to recognize a start point and a goal point respectively corresponding to an initial configuration and a goal configuration of a manipulator, and an obstacle located between the start point and the goal point; and a path planning generator using the processor to recognize the obstacle as an intermediate point when there is an obstacle between a start point and a goal point of a configuration space, to select a waypoint having a smallest goal score from a plurality of waypoints located at the periphery of the intermediate point, to divide a section from the start point to the goal point into a plurality of sections based on the selected waypoint, to simultaneously expand trees with respect to sections each having a waypoint with a solution of inverse kinematics and to expand a tree after the expansion of the trees is finished in the sections each having the waypoint with the solution of inverse kinematics, with respect to a section having a waypoint without a solution of inverse kinematics, to generate a search graph, and to connect the start point and the goal point using the search graph to generate an optimal path to avoid the obstacle.

The path planning generator may select certain points separated from the intermediate point by predetermined distances, respectively connect the certain points to the start point and the goal point, and select a certain point, in which the obstacle is not present, as the waypoint.

The path planning generator may randomly sample a certain point in the configuration space, searches for a node having a smallest goal score, connect the certain sampled point with the node, expand a tree such that the node reaches the target point through the waypoint, and generate a search graph.

A suitable waypoint is selected using a goal score, a section from a start point to a goal point through the waypoint is divided into a plurality of sections based on the waypoint with a solution of inverse kinematics, and trees are simultaneously expanded in the sections using a Best First Search & Rapidly Random Tree (BF-RRT) algorithm so as to generate a path. By this configuration, a probability of local minima occurring is decreased compared with the case where the waypoint is randomly selected. In addition, since the trees are simultaneously expanded in the sections each having the waypoint with a solution of inverse kinematics, the solution may be rapidly obtained. A time consumed to search for an optimal motion path may be shortened and path plan performance may be improved.

Since a certain point is simultaneously used for the expansion of the trees when the trees are simultaneously expanded in the sections, the number of samples discarded may be decreased and the expansion of the tree may be more rapidly performed.

If an intermediate configuration is present, the intermediate configuration is substituted for the certain point with a predetermined probability. Thus, convergence may be more rapidly performed and a solution may be more rapidly obtained.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
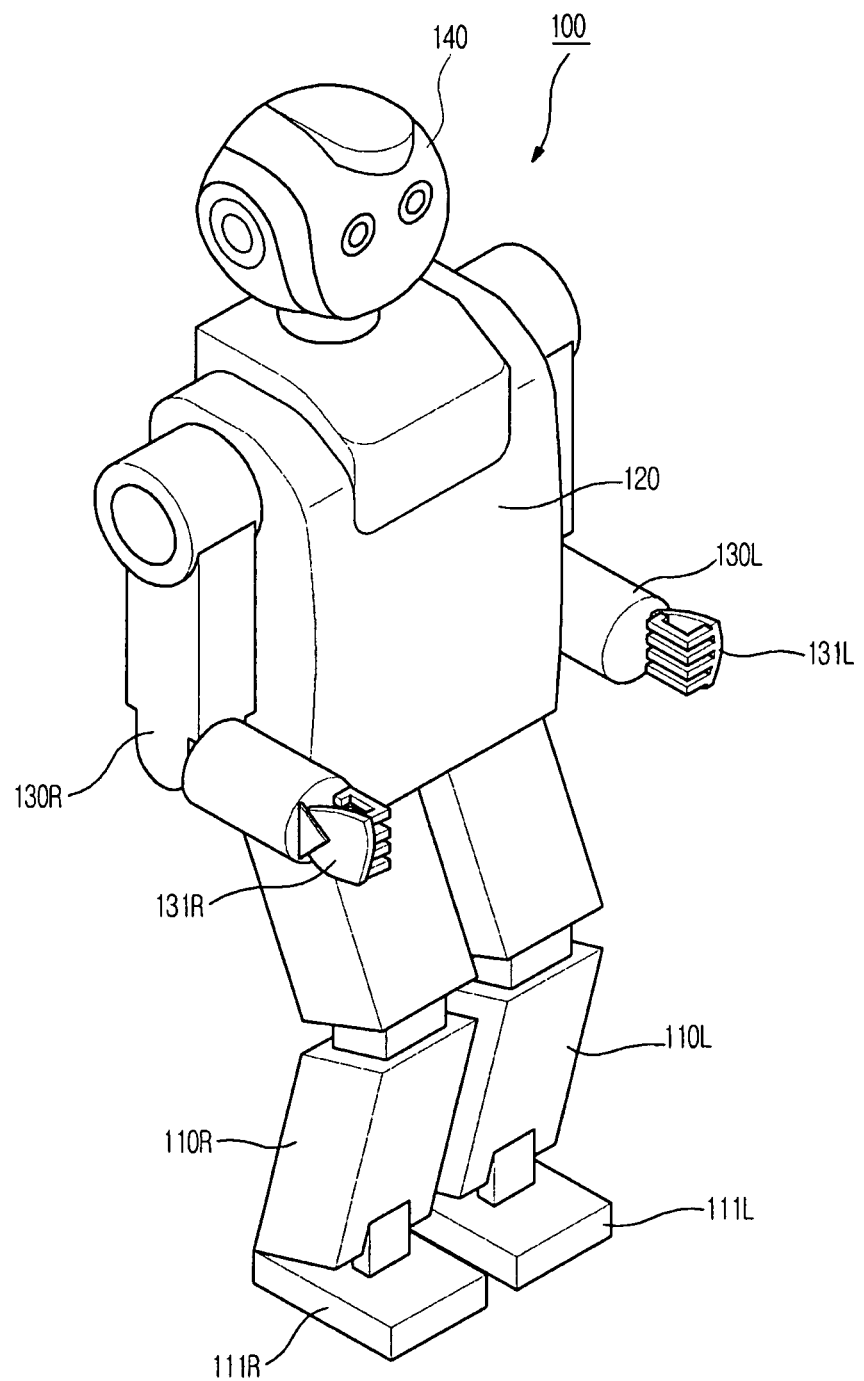
FIG. 1 is an appearance view showing an example of a robot according to an embodiment.

Reference will now be made in detail to the at least one embodiment, examples of which are illustrated in the accompanying drawings, wherein like reference numerals refer to like elements throughout.

FIG. 1 is an appearance view showing an example of a robot according to an embodiment.

In FIG. 1, the robot 100 according to the embodiment is a bipedal robot which walks erect using two legs 110R and 110L similar to a human, and includes a trunk 120, two arms 130R and 130L and a head 140 mounted on an upper side of the trunk 120, and feet 111R and 111L and hands 131R and 131L respectively mounted on the front ends of the two legs 110R and 110L and the arms 130R and 130L. In reference numerals, R and L denote right and left, respectively.

Figure 2:
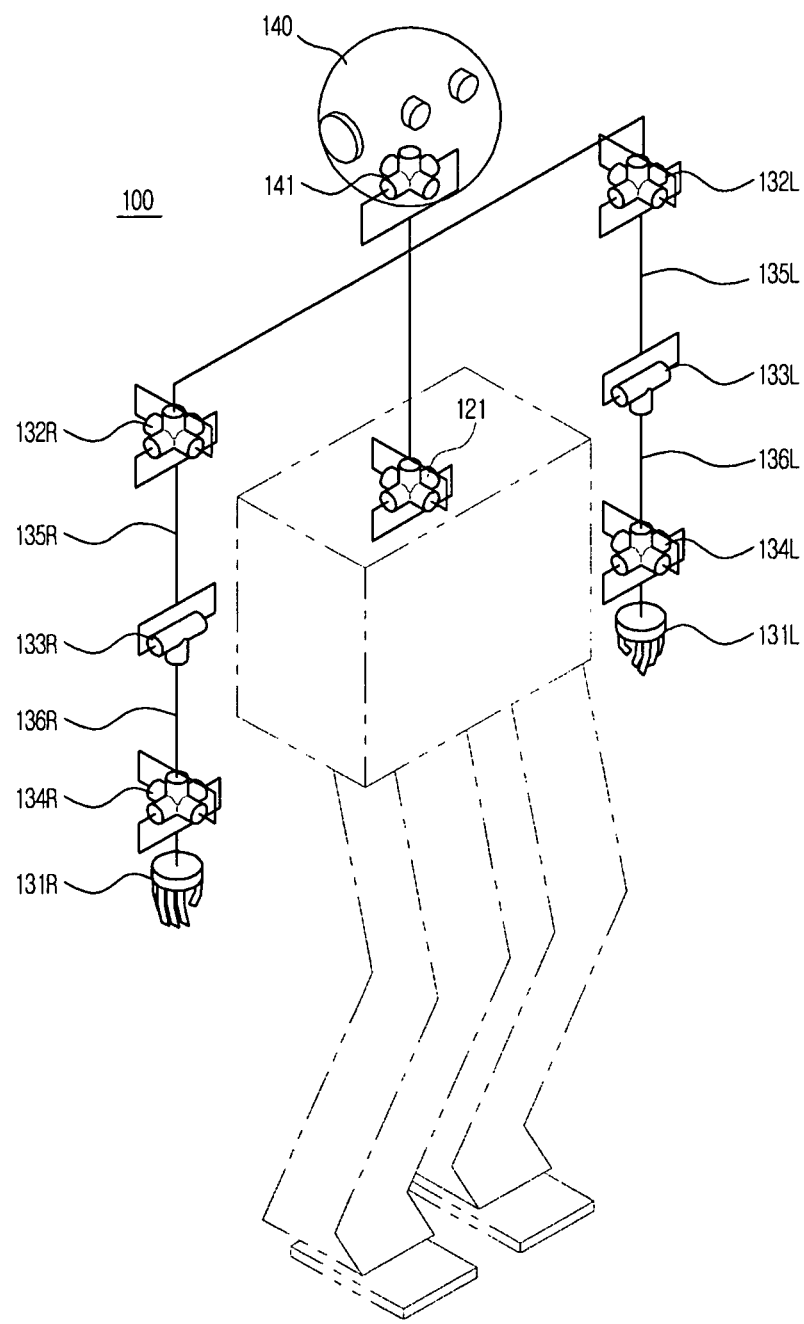
FIG. 2 is a view showing the structure of the main joints of the robot shown in FIG. 1.

FIG. 2 is a view showing the structure of the main joints of the robot shown in FIG. 1.

In FIG. 2, the two arms 130R and 130L respectively include shoulder joints 132R and 132L, elbow joints 133R and 133L and wrist joints 134R and 134L such that the portions corresponding to the shoulders, the elbows and the wrists of the robot 100 rotate. The shoulder joints 132R and 132L are located on both ends of the upper side of the trunk 120.

The shoulder joints 132R and 132L of the arms 130R and 130L may move in an x-axis (roll axis), a y-axis (pitch axis) and a z-axis (yaw axis), the elbow joints 133R and 133L may move in the y-axis (pitch axis), and the wrist joints 134R and 134L may move in the x axis (roll axis), the y-axis (pitch axis) and the z-axis (yaw axis).

The two arms 130R and 130L respectively include upper links 135R and 135L to connect the shoulder joints 132R and 132L and the elbow joints 133R and 133L and lower links 136R and 136L to connect the elbow joints 133R and 133L and the wrist joints 134R and 134L so as to move with a predetermined degree of freedom according to the movable angle ranges of the joints 132R and 132L, 133R and 133L, and 134R and 134L.

The trunk 120 connected to the two legs 110R and 110L includes a waist joint 121 so as to rotate the waist portion of the robot 100, and the head 140 connected to the trunk 120 includes a neck joint 141 so as to rotate a neck portion of the robot 100.

In the embodiment, the two arms 130R and 130L configure a manipulator 130 to perform a motional task, and the two hands 131R and 131 provided on the front end of the manipulator 130 configure an end effector 131 to grasp a goal (object). These are schematically shown in FIG. 3.

Figure 3:
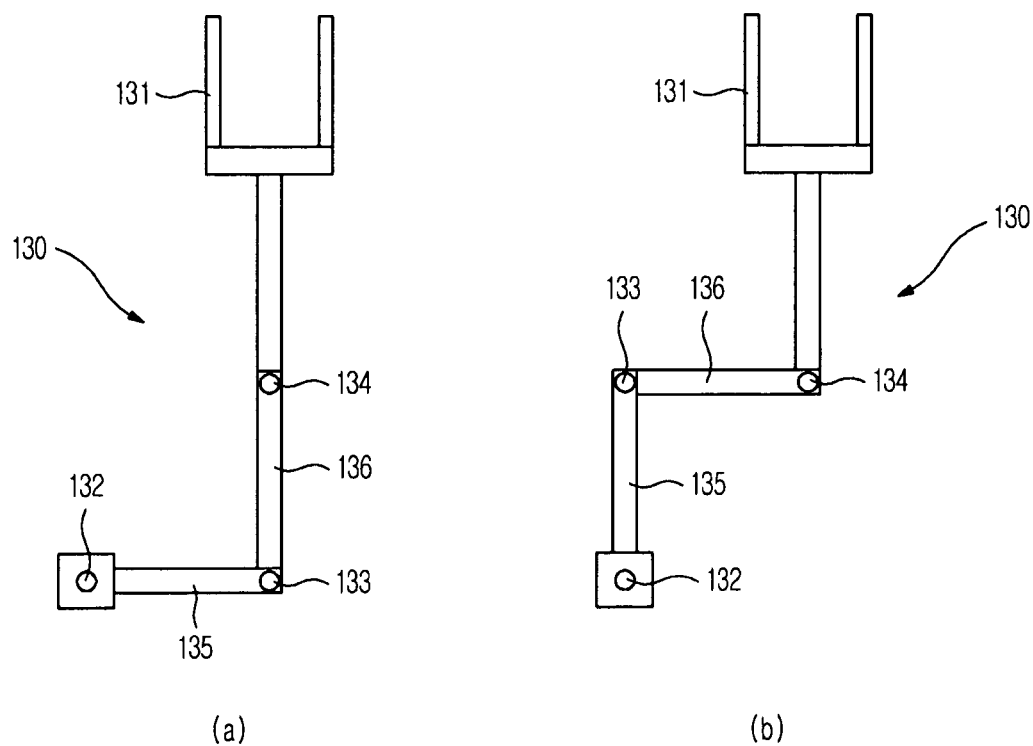
FIGS. 3(a) and 3(b) are views schematically showing the configuration of a kinematic redundant actuation manipulator of a robot according to an embodiment.

FIG. 3 is a view schematically showing the configuration of a kinematic redundant actuation manipulator of a robot according to an embodiment.

In FIG. 3, the manipulator 130 is manufactured so as to move similar to the arm or hand motion of a human by an electrical or mechanical mechanism. In most manipulators 130 which are currently being used, several links (in detail, an upper link or a lower link) are connected to each other by several joints (in detail, shoulder joints, elbow joints or wrist joints). The motional characteristics of the manipulator 130 are determined according to a geometrical relationship between the links and the joints. Mathematical representation of such a geometrical relationship is kinematics. In general, the manipulator moves the end effector 131 with such kinematic characteristics in a direction to perform a task. The manipulator 130 according to the embodiment moves the end effector 131 to a goal point to grasp an object using links, the positions and directions of which are adjusted.

As shown in FIG. 3, the shape of the manipulator 130 which moves to the goal point in order to grasp the same object may be variously changed as shown in FIG. 3(a) or 3(b).

Figure 4:
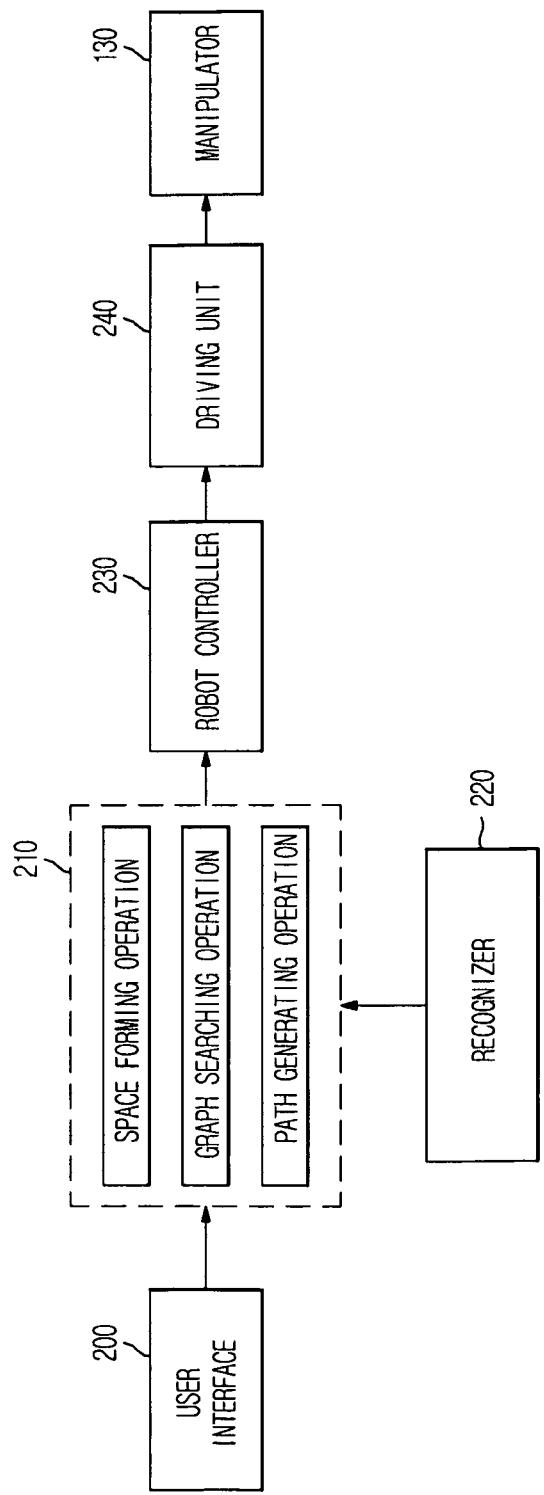
FIG. 4 is a control block diagram of an apparatus to plan a motion path of a manipulator in a robot according to an embodiment.

FIG. 4 is a control block diagram of an apparatus to plan a motion path of a manipulator in a robot according to an embodiment, which includes a user interface unit 200, a path planning generator 210, a recognizer 220, a robot controller 230, and a driving unit 240.

The user interface unit 200 allows a user to input a task command (e.g., a grasping command to grasp an object placed on a table) of the robot and, more particularly, the manipulator 130 by manipulating a switch or via voice, for example, but is not limited to these examples and may be any type of input device.

The path planning generator 210 generates and sends a path plan to control the movement of the manipulator 130 according to the task command input via the user interface unit 200 to the robot controller 230. A method of generating a path plan by the path plan generator 210 includes a space forming operation, a graph searching operation and a path generating operation.

In the space forming operation, a Configuration Space (C-Space) to generate a collision avoidance path is detected. The term "configuration" refers to a set of variables to represent the position and the direction of the moving manipulator 130, and all spaces occupied by configurations are called the C-Space.

In the graph searching operation, a connected network representing a searchable path to generate an optimal path is generated. Configurations are randomly extracted based on the C-Space formed by a cell decomposition method, such as a tree with respect to the moving manipulator 130, nodes are generated by a method of excluding a configuration colliding with an obstacle space, and a search tree to connect the generated nodes is generated, thereby searching for a search graph to generate a path.

In the path generation operation, an obstacle space is avoided so as not to cause collision in the connected network of the given search space, and an optimal path connected between a start point and a goal point is generated.

The recognizer 220 recognizes information which is given in order to perform a task command, that is, a configuration (start point) at an initial position of the manipulator 130 before performing the task command, a configuration (goal point) at a goal point of the manipulator 130 where the task command may be performed, and obstacles between the start point and the goal point, in the C-Space, and sends the information to the path planning generator 210. This recognized information is used to plan the motion path of the manipulator 130 by the path planning generator 210.

The robot controller 230 controls the driving unit 240 according to the path plan received from the path planning generator 210, drives the manipulator 130, and controls the movement of the manipulator 130.

Hereinafter, the robot having the above-described structure, the method of planning the motion path thereof, and the effects thereof will be described.

As an example of a method of planning a motion path while satisfying constraints, such as obstacle collision avoidance, there is a sampling-based motion planning method.

As an example of such a method, there is a Rapidly Random Tree (RRT) searching method.

A tree expansion method of the RRT is largely divided into a Single-RRT, a Bi-Directional RRT (BI-RRT), and a Best First Search & RRT (BF-RRT). The Single-RRT is used to travel from an initial configuration to a goal configuration. One configuration is randomly selected in the C-Space with the initial configuration, the goal configuration and the constraints, a node closest to the randomly selected configuration is selected, a virtual line is drawn, a sample in the virtual line is included in a tree if the sample satisfies the constraints, and the tree is continuously expanded until the sample becomes equal to the goal configuration.

In the Single-RRT, since a certain point is selected and the tree is expanded in order to reach the goal configuration, a relatively large number of nodes is generated and thus a path search speed is decreased. In order to prevent the path search speed from being decreased, in the BI-RRT, the tree is expanded not only in the start configuration but also in the goal configuration (while swapping the tree). If the tree is connected while the tree is expanded, the graph search algorithm is performed so as to obtain a path.

Both the Single-RRT and the BI-RRT are characterized in that the goal configuration is set. However, in the case of a robot with a redundant degree of freedom, there may be various configurations reaching the goal point (see FIG. 3).

In addition, if a configuration reaching the goal point is a configuration in which collision with an obstacle occurs midway, a path reaching the goal configuration may not be generated.

The BF-RRT refers to a method of satisfying the goal score of the goal point instead of the configuration of the goal point. In this method, inverse kinematics is not initially solved and a sample is expanded so as to reach a final position in the case of a redundant manipulator. The redundant manipulator refers to a robot arm having a higher degree of freedom than that necessary to perform a task in a working space.

Figure 5:
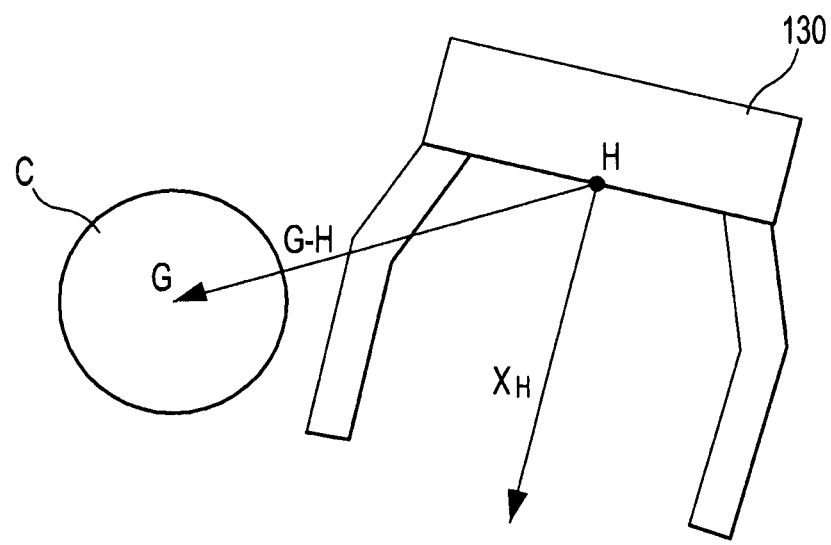
FIG. 5 is a view showing a model of a process of grasping an object by a robot according to an embodiment.

As shown in FIG. 5, a goal function which is satisfied when a robot grasps a goal object includes a distance $\|G-H\|$ between a goal point G and the end effector of the robot and a directional vector $|(G-H)*x_H-1|$.

$$\text{Goal Function} = \|G-H\| + \alpha * |(G-H)*x_H-1| \quad \text{Equation 1}$$

where, $\|G-H\|$ denotes the distance from the end effector to the goal point, $|(G-H)*x_H-1|$ denotes the directional vector, and $\alpha$ denotes a constant.

The BF-RRT performs the following operations.

Figure 6:
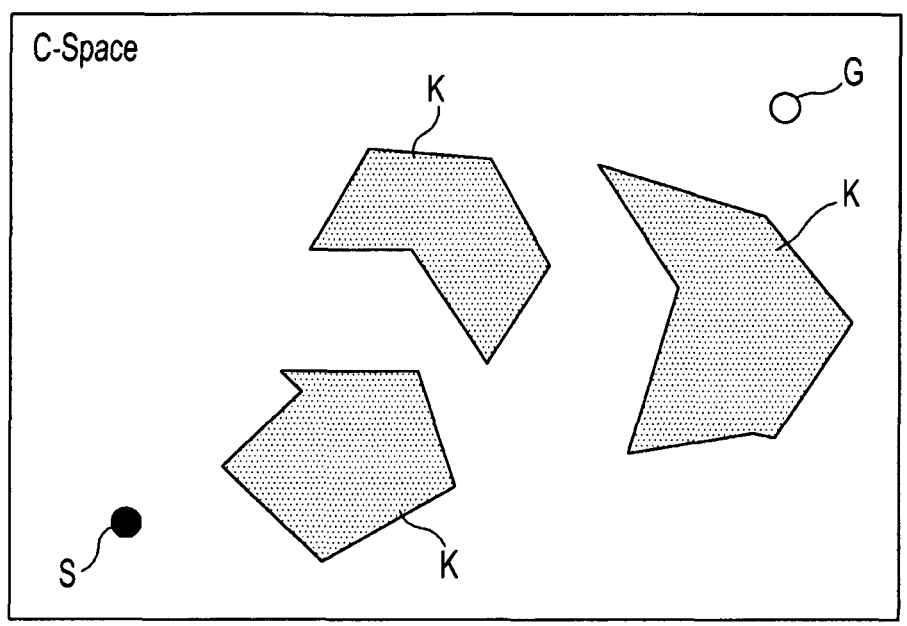
FIGS. 6 to 16 are views showing a method of generating a path using a Best First Search & Rapidly Random Tree (BF-RRT) in an embodiment.

Operation 0: A C-Space with a goal point S, a goal point G, constraints, and a goal function is formed. The start point S, the goal point G and the constraints to avoid collision with an obstacle K are recognized. In addition, the goal function, which is the function of the distance from the goal point G to the end effector, and the directional vector are recognized. In addition, the C-Space is formed from the start point S, the goal point G, the constraints and the goal function (see FIG. 6).

Operation 1: A certain point is randomly sampled and selected in the C-Space.

Operation 2: A node having a smallest goal score is selected in the tree. In an initial state, the node having the smallest goal score in the tree is the start point S.

Operation 3: The selected node and the certain point are connected. At this time, a new sample is stored only when the goal function is less than a previous goal function.

Figure 7:
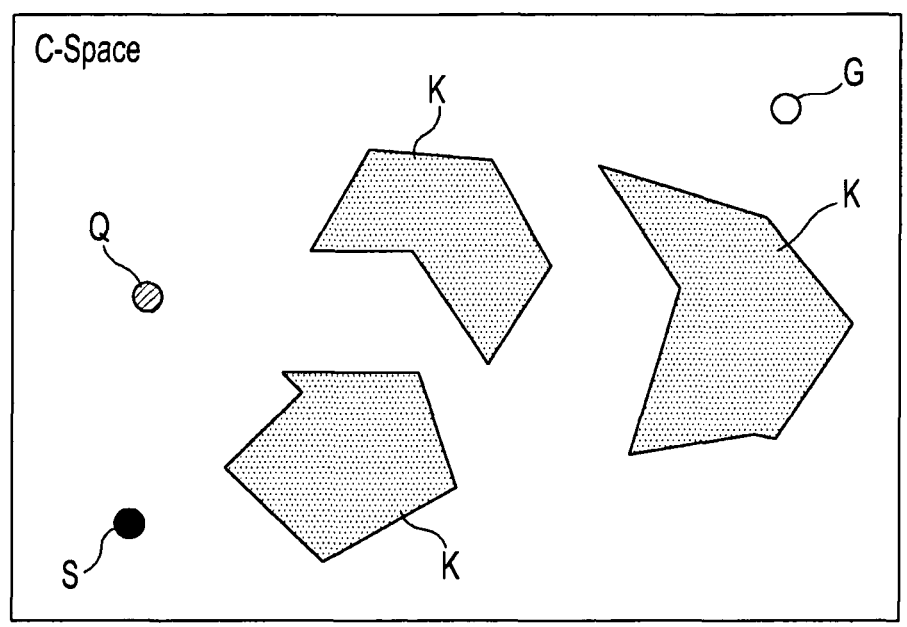
Figure 8:
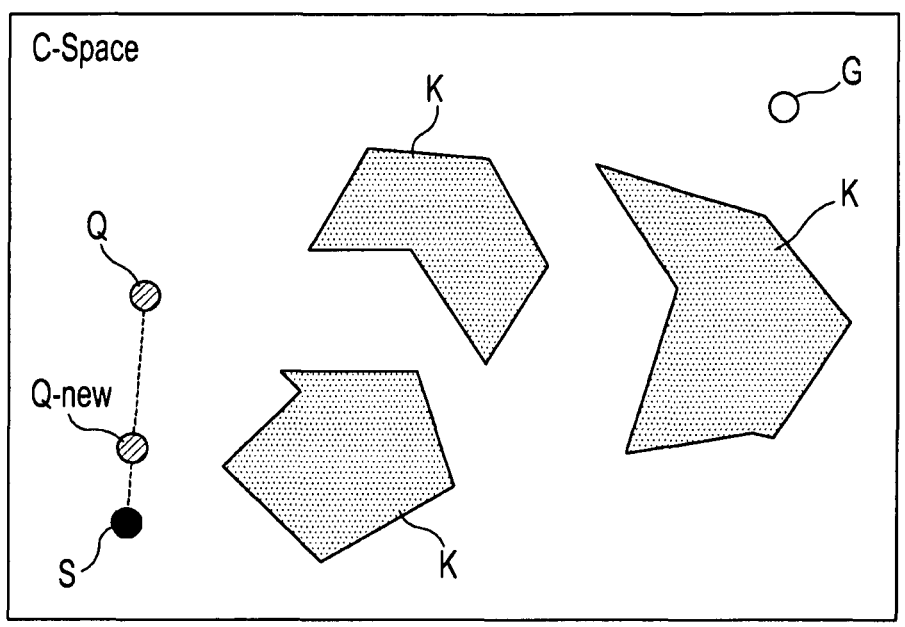
Figure 9:
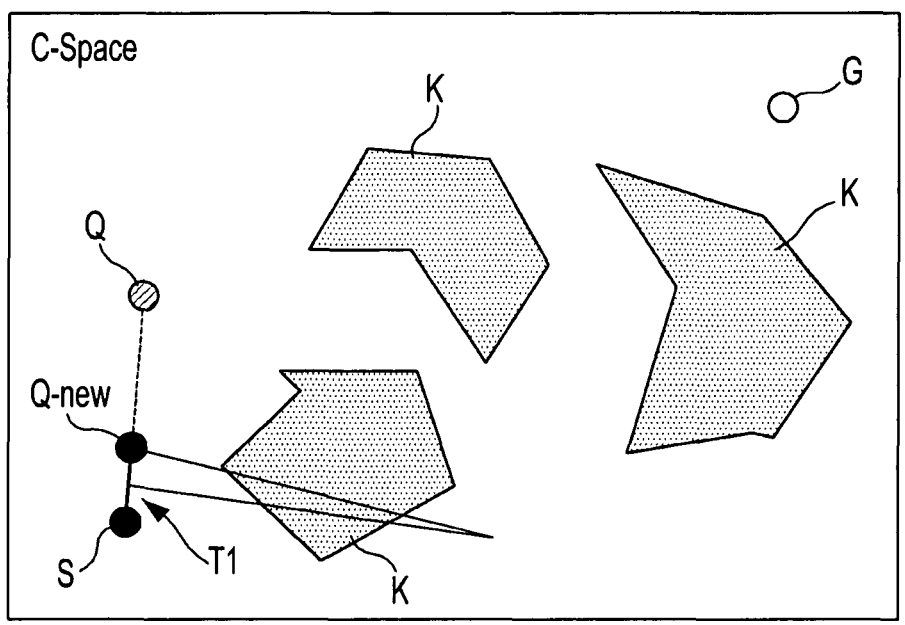
Figure 10:
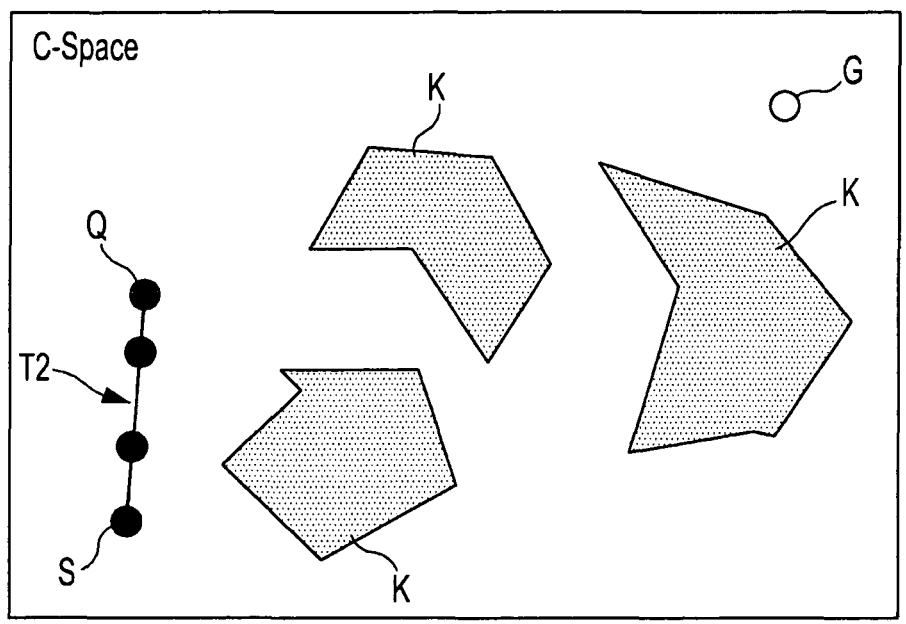
Figure 11:
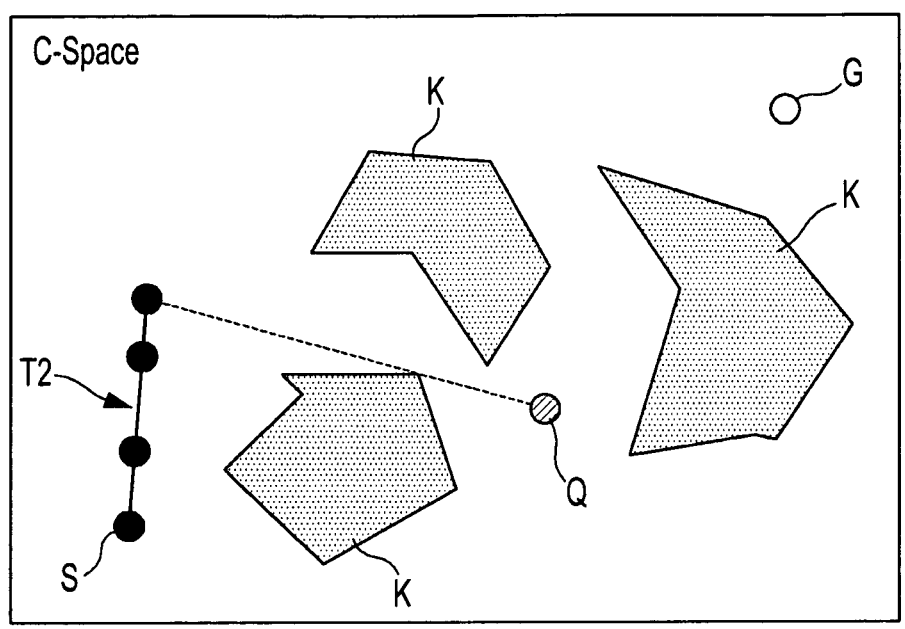
Figure 12:
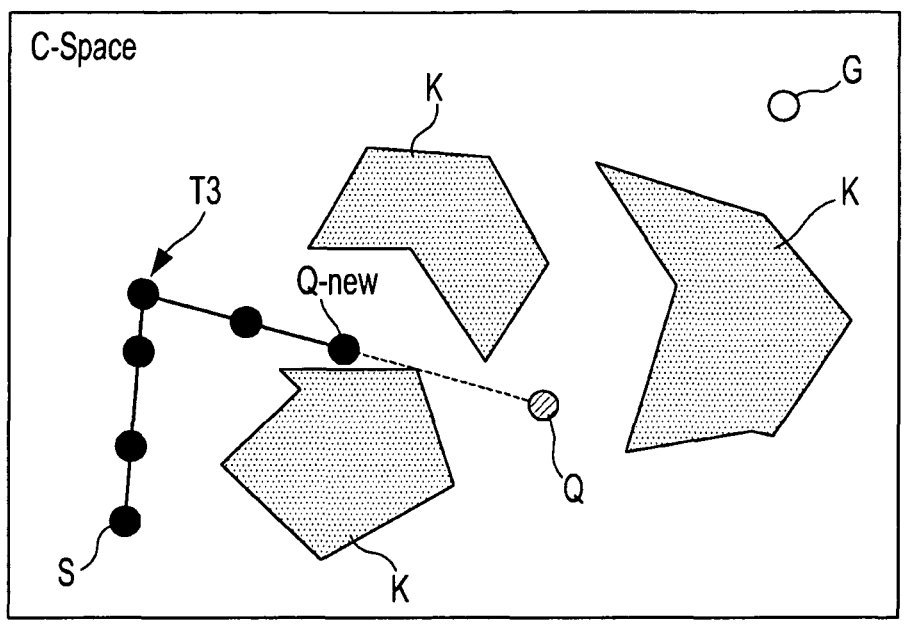
Figure 13:
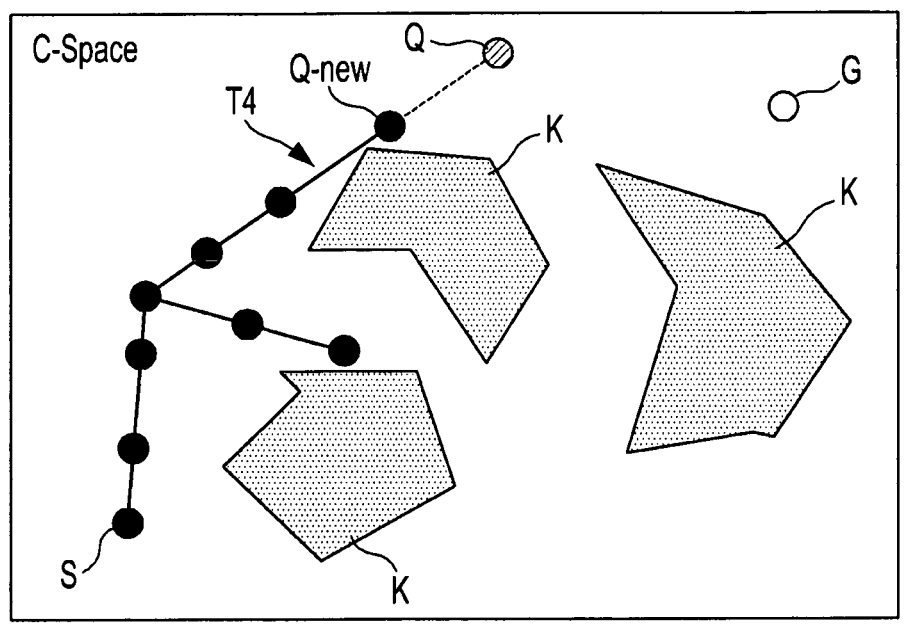
Figure 14:
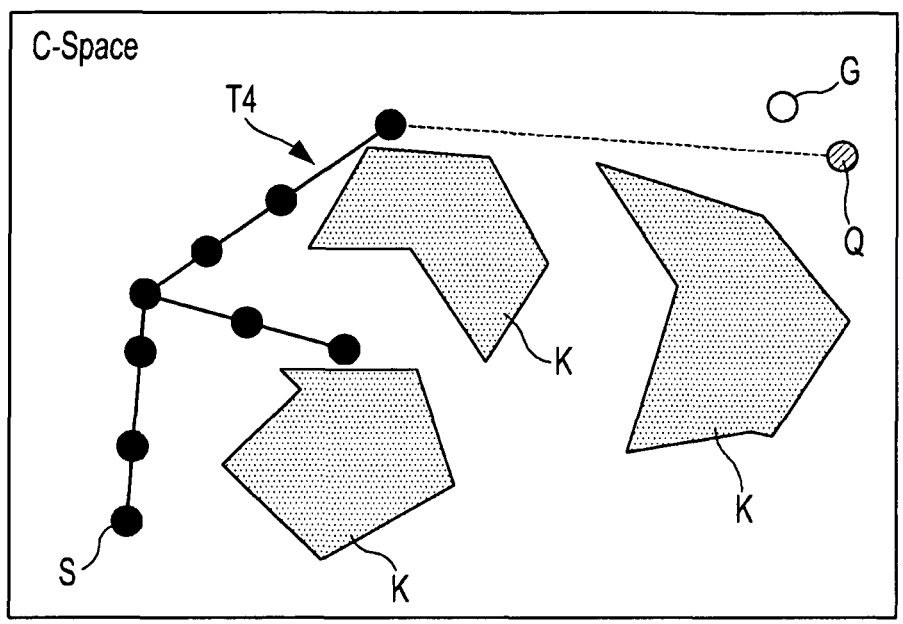

As shown in FIGS. 7 and 8, a certain point Q is sampled (see FIG. 7). A virtual line (dotted line) is connected between the sampled point Q and a node Q-new having a smallest goal score, and a new sample separated from the sampled point by a predetermined distance is then generated (see FIG. 8). Constraints (joint limit, collision avoidance, etc.) and a goal score of the new sample are checked and the sample is added if the constraints and the goal score condition are satisfied (see FIGS. 9 and 10). Such a method is repeatedly performed until a new sample is constantly expanded, such that a tree T1 is expanded into a tree T2.

FIGS. 11 to 14 show operations to repeatedly perform Operations 1, 2 and 3 so as to add new samples to the tree.

Figure 15:
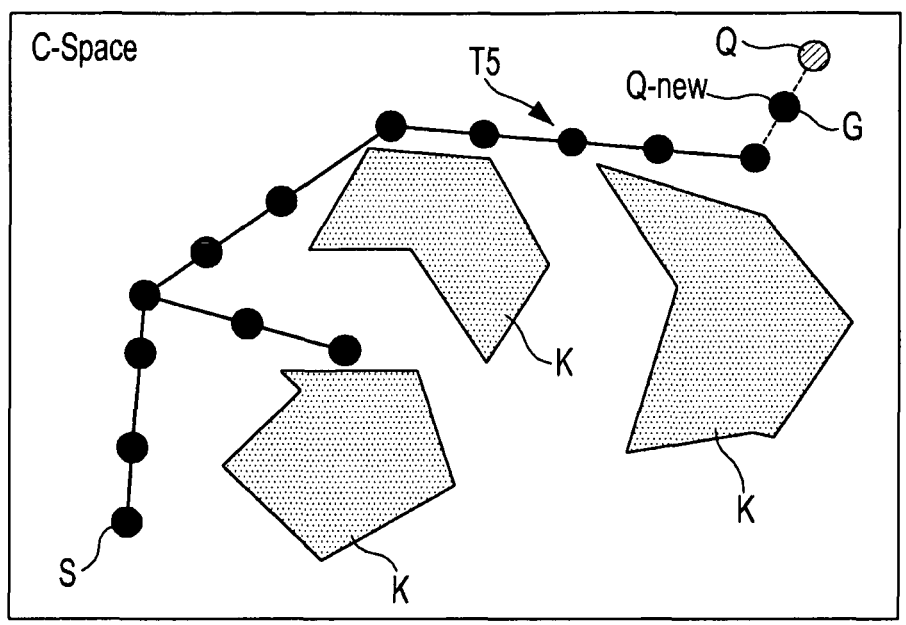
Figure 16:
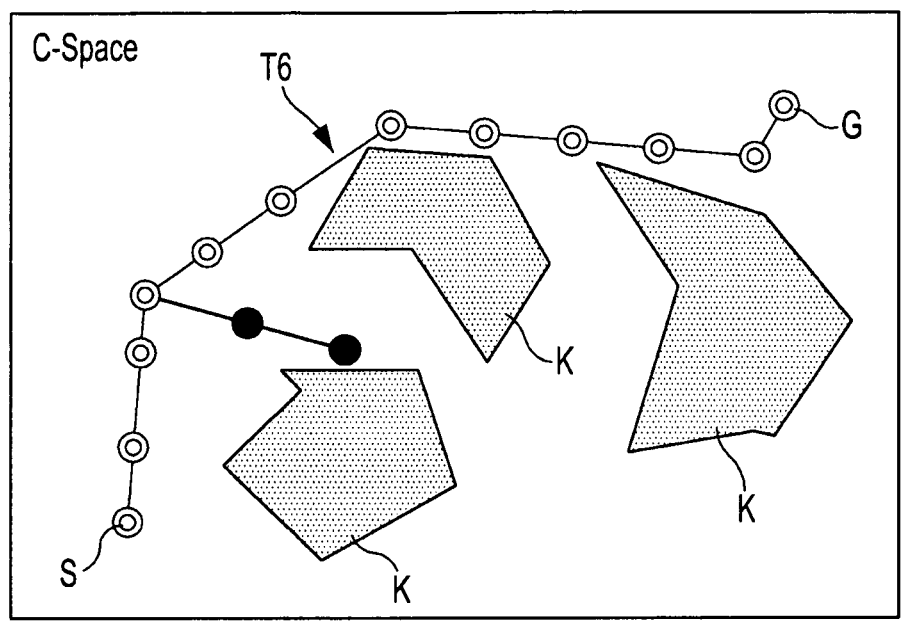
Figure 17:
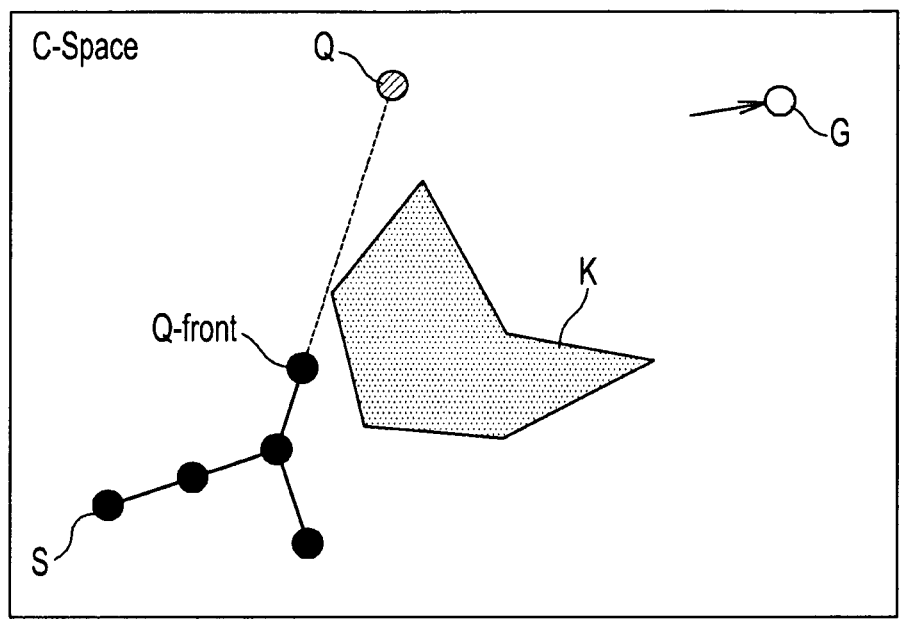
FIGS. 17 to 20 are views showing various local minima situations which may occur in a method of generating a path using a BF-RRT method in an embodiment.
Figure 18:
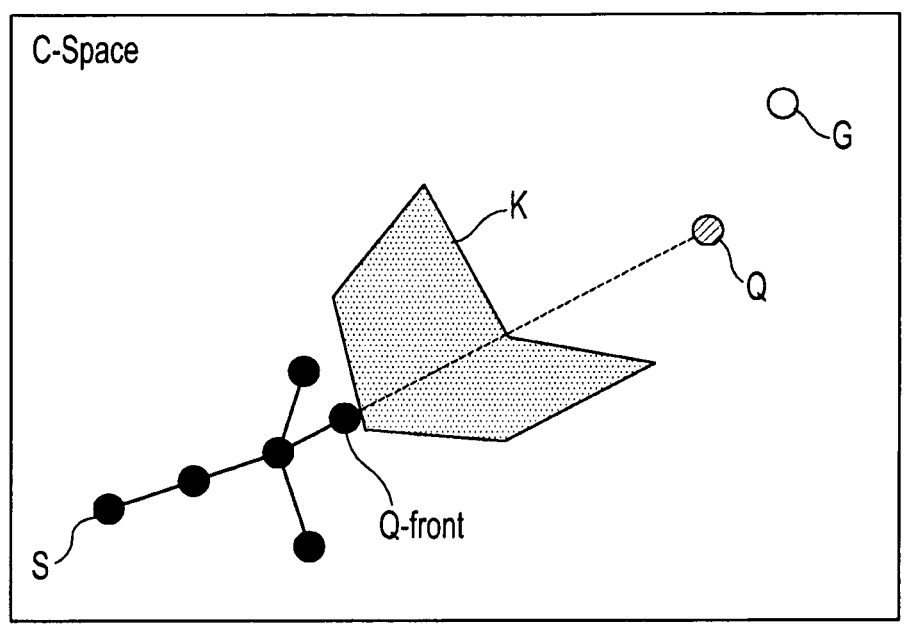
Figure 19:
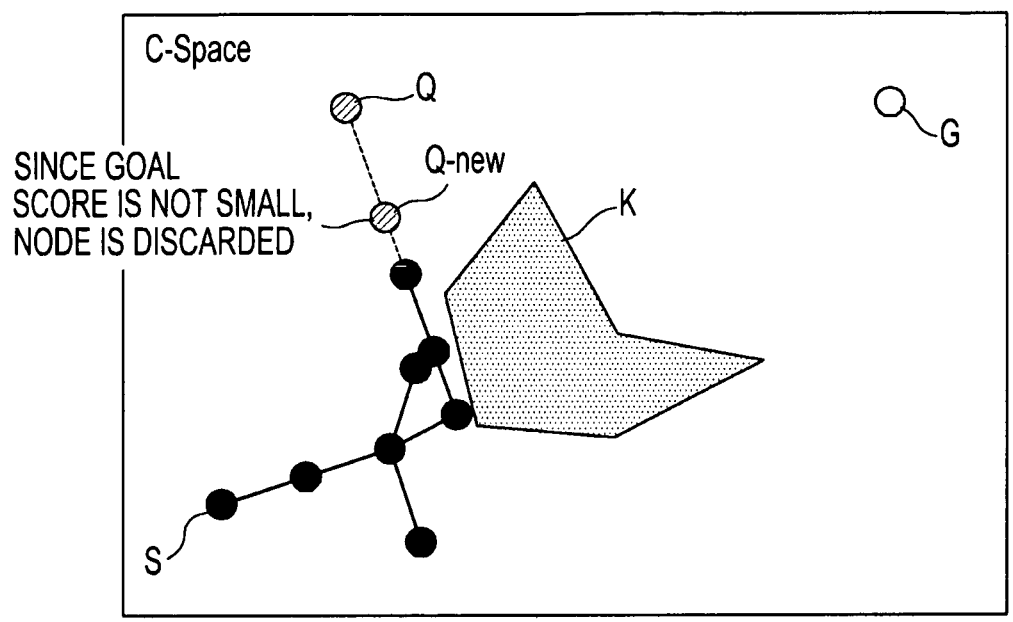
Figure 20:
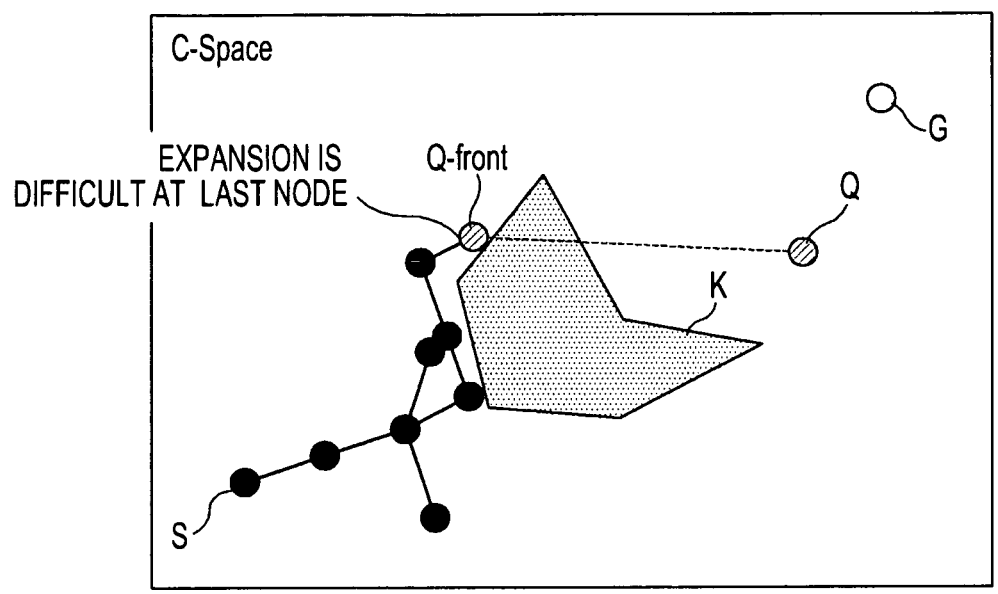

Operation 4: If the expanded node satisfies the goal score condition, it is determined that a final node satisfies the goal function so as to generate a path by graph searching (see FIGS. 15 and 16).

The BF-RRT is advantageous in that a solution may be obtained even when the solution of the inverse kinematics is not present or the solution of the inverse kinematics is present in a path including an obstacle. However, since a point having a smallest goal score is selected so as to expand the tree, local minima may occur if the goal function is not adequately set.

FIGS. 17 to 20 are views showing various local minima which occur while a tree is expanded.

If it is determined that local minima occur while Operations 1 to 3 of the BF-RRT are performed, the Single-RRT method is partially applied. By applying this method, the solution may be obtained when the solution of the inverse kinematics is not obtained, when local minima occur or when the directional vector of the goal function is not accurate.

In more detail, if local minima occur while Operations 1 to 3 of the existing BF-RRT are repeatedly performed, Operation 4: It is determined whether local minima occur.

Operation 5: If it is determined that local minima occur, the existing tree is expanded in a certain direction.

Operation 6: A closest node is selected and is connected to the tree.

Figure 21:
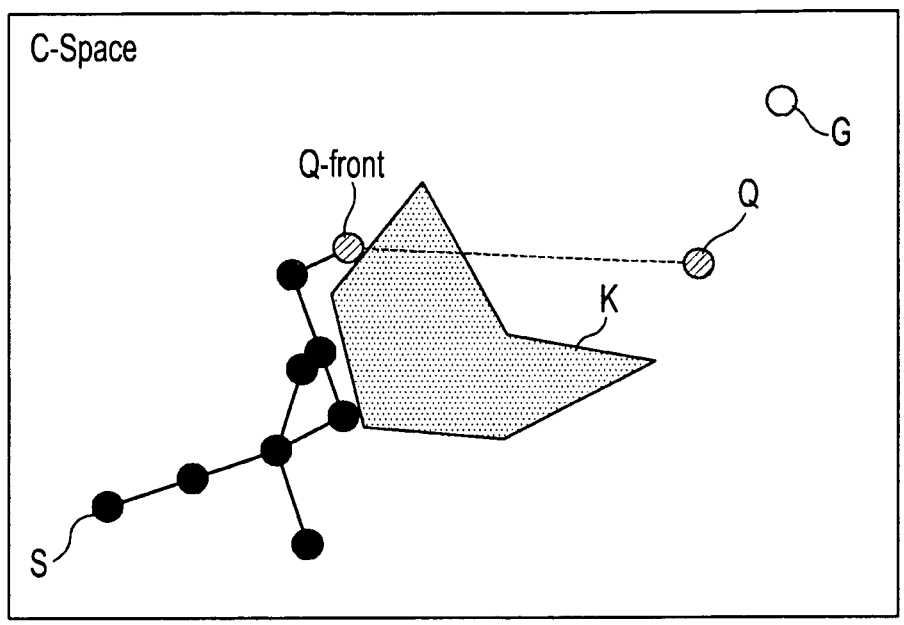
FIG. 21 is a view showing a local minima situation which occurs while a tree is expanded using the BF-RRT method in an embodiment.
Figure 22:
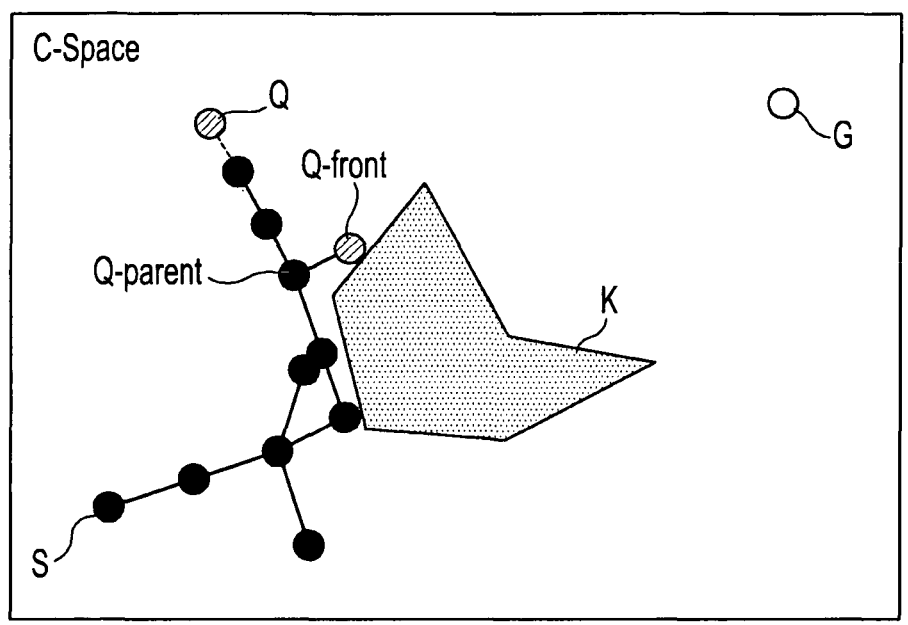
FIG. 22 is a view explaining a method of escaping from local minima when local minima occur in FIG. 21.

If local minima occur while the tree is expanded (see FIG. 21), a certain point Q is randomly selected, is connected to a closest node Q-front by a dotted virtual line, a new sample separated by a predetermined distance is generated, constraints (joint limit, collision avoidance, etc.) and the goal score of the new sample are checked, and the sample is added to the tree if the new sample satisfies the constraint and the goal score condition. This process is continuously performed until escaping from local minima (see FIG. 22).

Then, if the goal score of the expanded node of the tree satisfies a goal point condition, a final node is recognized as a goal point and a path is formed by graph search.

The BF-RRT which may obtain a solution without the solution of inverse kinematics requires an accurate goal function. Otherwise, local minima occur and thus the solution may not be obtained. In order to obtain the solution without the accurate goal function, the tree is expanded in a certain direction or the goal function is changed so as to expand the tree when local minima occur.

However, even in this method, since the tree is expanded in a wrong direction before escaping from local minima, a speed to obtain the solution is not sufficiently high.

In order to solve such a problem, a method of recognizing an intermediate waypoint passing an intermediate obstacle is suggested. However, in this method, a preprocessing time to select the intermediate waypoint is long. In addition, as the number of obstacles is increased, a probability of a wrong intermediate waypoint being selected is increased. Thus, a probability of local minima occurring is high. In addition, overall path planning performance may be changed depending on which waypoint is selected from various waypoints.

Accordingly, in order to improve overall path planning performance, a suitable waypoint needs to be selected using the goal function. In addition, various trees are simultaneously expanded using the configuration of the waypoint so as to efficiently reduce the time consumed to perform the existing preprocessing, and a certain randomly sampled point is used for the expansion of the various trees so as to implement a rapid path plan.

In the embodiment, a start point, a goal point and an obstacle are first recognized, and an intermediate point is recognized using the obstacle. A configuration immediately before the intermediate point and a configuration immediately after the intermediate point are considered with respect to various waypoints of the intermediate point, and waypoints are selected using a goal function. In addition, the solutions of the inverse kinematics of the waypoints are obtained. At this time, if the number of waypoints is plural, the solutions of the inverse kinematics are obtained with respect to the waypoints. Waypoints, each having a solution of the inverse kinematics, are stored as start points of respective nodes, and a section having a start node and a subsequent neighboring node is stored.

In detail, a certain point is selected in a C-Space (Operation 1), nodes having a smallest goal score of a first intermediate point are selected in a tree (Operation 2), and the selected nodes and the certain point are connected (Operation 3). At this time, a new sample is added to the tree for each section only when the goal score is less than the existing goal score. It is determined whether local minima occur (Operation 4), the tree is expanded from the existing tree in a certain direction (Operation 5), and it is determined whether the goal score of the current tree is less than that of one of the intermediate points (Operation 6). If the goal score of the current tree is less than that of one of the intermediate points, the section is stored and a next goal point is then selected (Operation 7). Then, it is determined whether a node, an initial configuration of which is not determined, is reached (Operation 8) and, if the tree is expanded to the node, the initial configuration of which is not determined, the initial configuration is recognized as the final configuration of the tree and the tree is expanded to a next node (Operation 9). It is determined whether the tree is expanded with respect to all sections (Operation 10) and, if all sections are searched, the method is finished (Operation 11). Although only the BF-RRT algorithm is described in Operations 1 to 11, the BI-RRT may be performed when both ends of one section are known for each section.

Hereinafter, a detailed operation will be described in detail.

Figure 23:
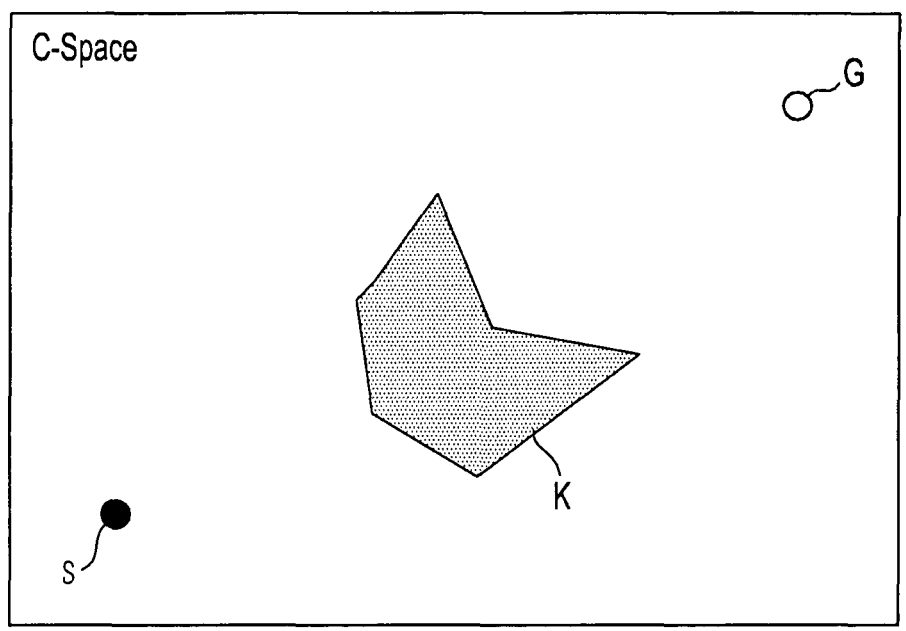
FIG. 23 is a view showing a Configuration Space (C-Space) according to an embodiment.

As shown in FIG. 23, the C-Space is a dynamic space in which the manipulator 130 performs a task, S denotes a start point in which the configuration of an initial position before the manipulator 130 performs the task is formed by one node in the C-Space, G denotes a goal point in which the configuration of a goal position where the manipulator 130 can perform the task, that is, an object can be grasped, is formed by one node in the C-Space, and K denotes a C-Space of an obstacle between the start point S and the goal point G.

Figure 24:
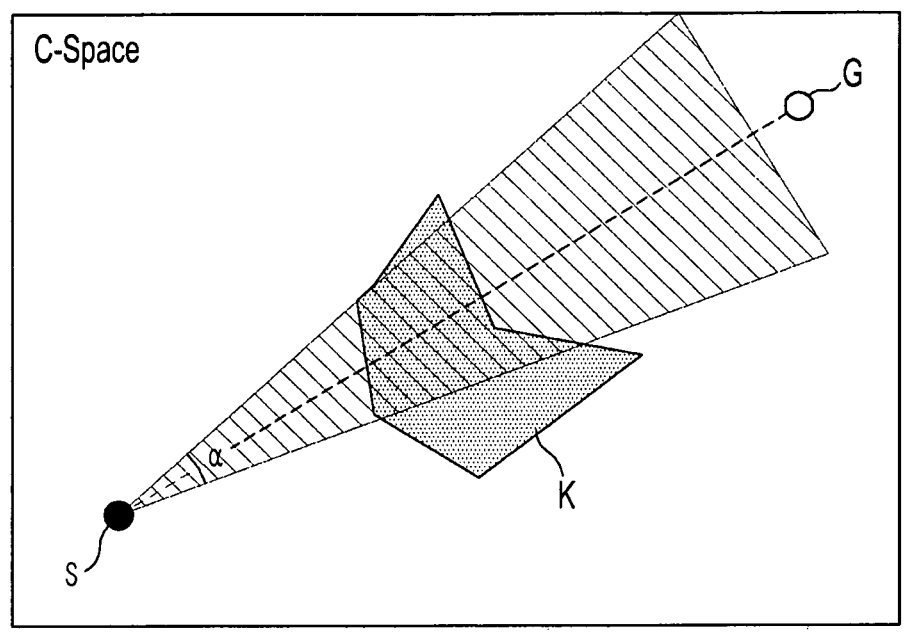
FIG. 24 is a view showing a process of recognizing an intermediate point in FIG. 23.

As shown in FIG. 24, an obstacle which is located within a predetermined angle α from a straight line connected between the start point S and the goal point G of the C-Space is recognized as an intermediate point K (it is to be noted that any point on the obstacle may be recognized as the "intermediate point" K).

Figure 25:
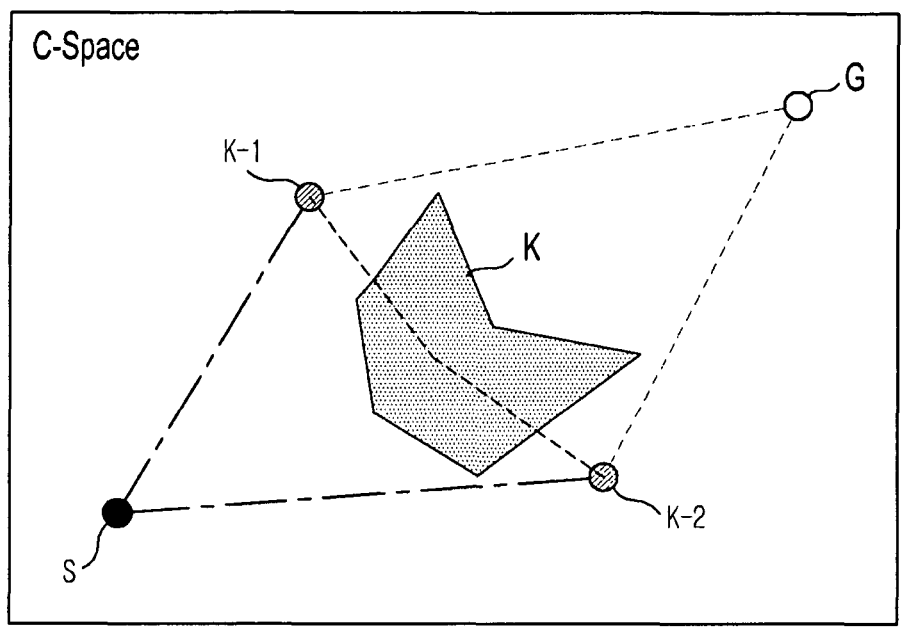
FIGS. 25 and 26 are views showing a process of selecting a waypoint based on the intermediate point recognized in FIG. 24.

As shown in FIG. 25, certain points K-1 and K-2 separated from the recognized intermediate point K by predetermined distances are selected, the selected points K-1 and K-2 and the start point S are connected, and the selected points K-1 and K-2 and the goal point G are connected. In FIG. 25, since the selected points K-1 and K-2 may be directly connected to the start point S and the goal point G without passing the intermediate point K, they are selected as waypoints. The points, selected as the waypoints, are intermediate nodes located at points where both the start point S and the target point G are viewed. The selected points K-1 and K-2 that are separated from the intermediate point K by predetermined distances may be separated from a center point of the obstacle or may be separated by predetermined distances from any of a number of points in various positions on the obstacle, where the points are recognized as an intermediate point K.

Figure 26:
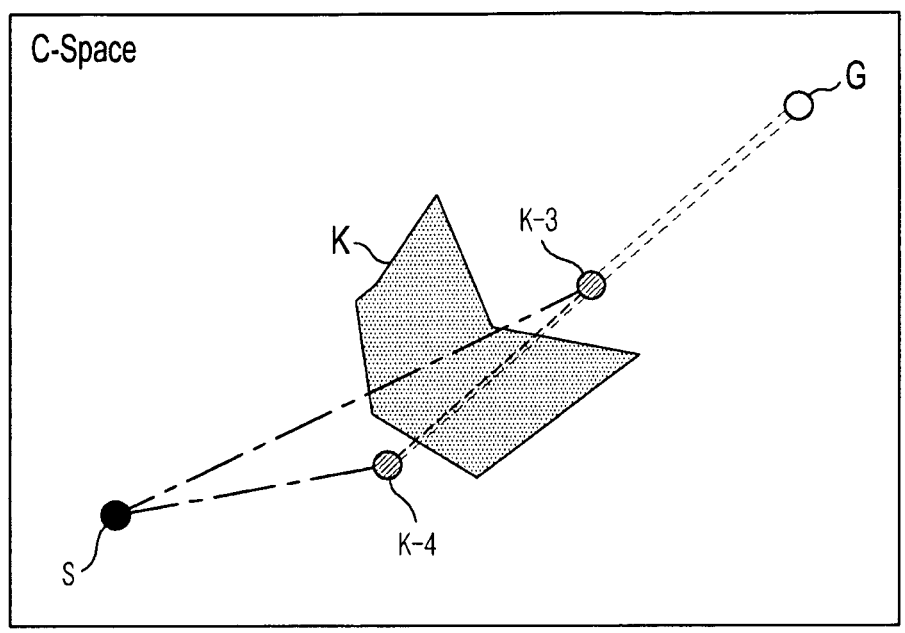

As shown in FIG. 26, certain points K-3 and K-4 separated from the recognized intermediate point K by predetermined distances are selected, the selected points K-3 and K-4 and the start point S are connected, and the selected points K-3 and K-4 and the goal point G are connected. In FIG. 26, the selected points K-3 and K-4 are not selected as waypoints, since the intermediate point K is located on the straight line connected between the start point S and the goal point G such that the start point S and the goal point G are not directly connected. That is, at the point K-3, the goal point G is viewed and the start point S is not viewed. At the point K-4, the start point S is viewed and the goal point G is not viewed. Therefore, the points K-3 and K-4 are not selected as the waypoints.

Figure 27:
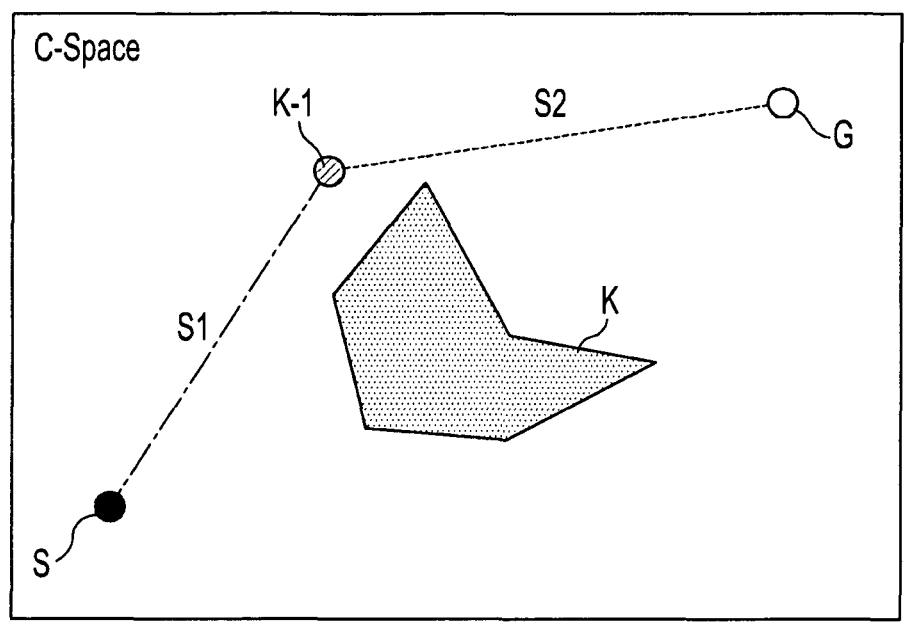
FIGS. 27 to 39 are views showing a process of planning a path of a robot according to an embodiment.

If the waypoints are selected, a goal waypoint passing a closest waypoint is finally selected in a configuration which is randomly sampled at the start point S. If the number of sampled configurations is plural, the goal waypoint is finally selected based on a goal score condition of a BF-RRT algorithm. As shown in FIG. 27, a waypoint K-1 having a small goal score is selected from two waypoints K-1 and K-2 as the final waypoint. If the final waypoint is selected, a section from the start point S to the goal point G may be divided into a first section S1 from the start point to the waypoint K-1 and a second section S2 from the waypoint K-1 to the goal point G.

In summary, the obstacle which is located within the predetermined angle α from the straight line connected between the start point S and the goal point G is recognized as the intermediate point K, the certain points K-1 and K-2 separated from the recognized intermediate point K by the predetermined distances are selected, and the certain points K-1 and K-2 where the start point S and the goal point G are viewed are selected as waypoints 1 and 2. A waypoint having a smaller goal score is selected from the waypoints 1 and 2 (K-1 and K-2) as the final waypoint.

Figure 28:
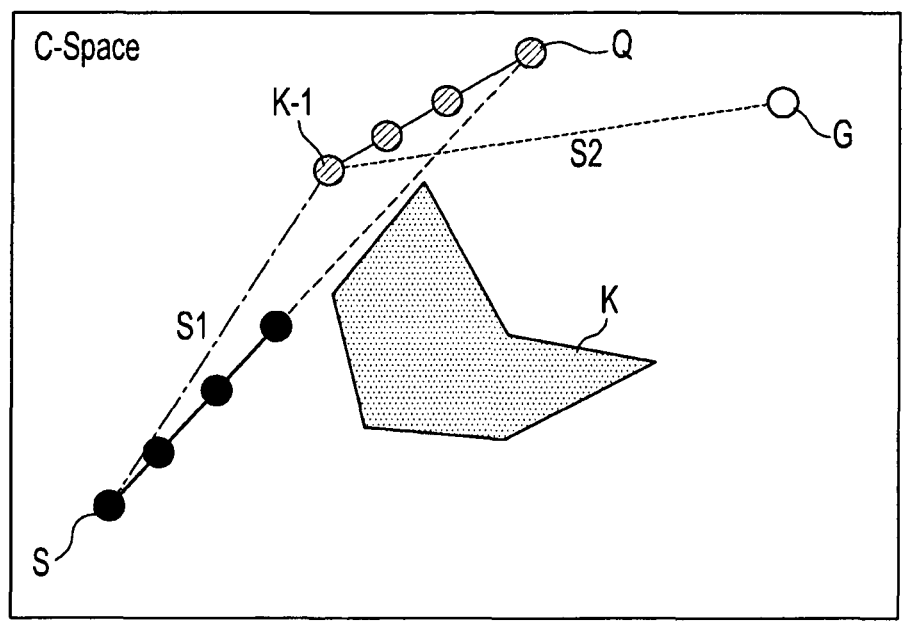

After the final waypoint is selected, the solution of the inverse kinematics of the selected waypoint is obtained. If the solution of the inverse kinematics of the waypoint is present, as shown in FIG. 28, a certain point Q is selected and trees begin to be simultaneously expanded from the start point and the waypoint K-1. At this time, the trees are expanded in a manner of adding samples satisfying constraints and the goal score condition on a line connected between the start point S and the certain point Q and a line connected between the waypoint K-1 and the certain point Q to the trees of the respective sections using the BF-RRT algorithm. Similar to the existing Single-RRT or BI-RRT, if the solution of the inverse kinematics of the waypoint or the goal point is present, the solution of the inverse kinematics is selected as a certain point according to a predetermined probability distribution. Thus, the start point rapidly converges upon the waypoint and the waypoint rapidly converges upon the goal point.

Figure 29:
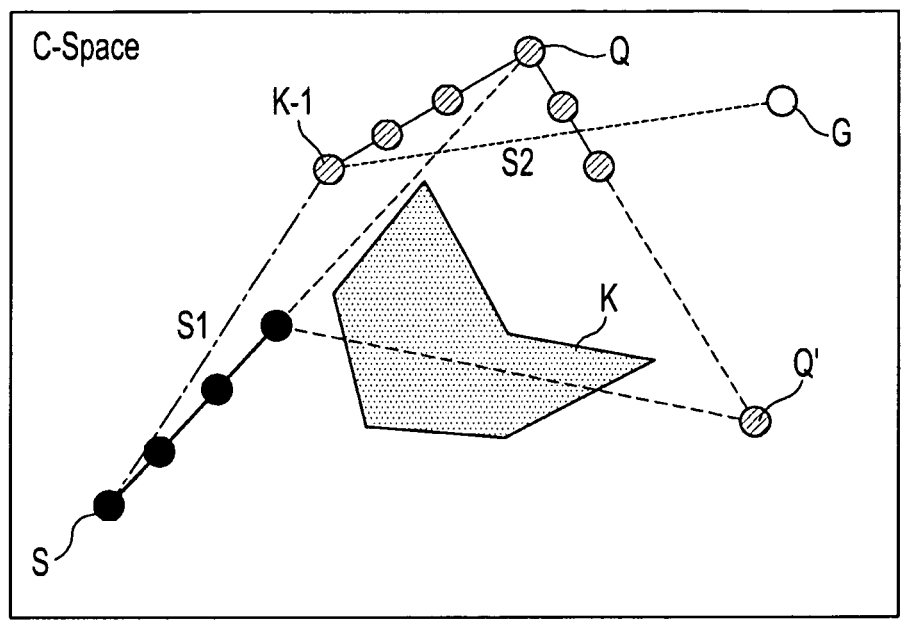

As shown in FIG. 29, a certain new point Q' is selected. When the trees are expanded from the start point S and the waypoint K-1 to the certain point Q, the obstacle K is placed between the tree of the first section S1 and the certain new point Q'. Thus, the goal score is small. The tree is no longer expanded in the first section S1.

Figure 30:
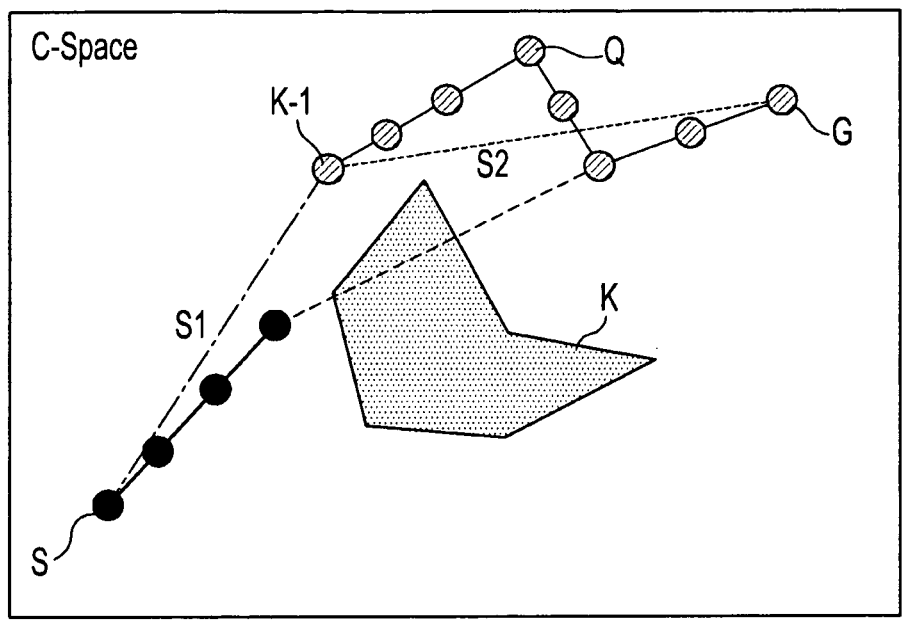

As shown in FIG. 30, even when the expansion of the tree in the second section S2 is finished, the tree is continuously expanded in the first section S1. At this time, if the solution of the inverse kinematics of the goal point is present, the tree is expanded in the first section S1 by inserting the goal point as the solution using a predetermined probability.

Figure 31:
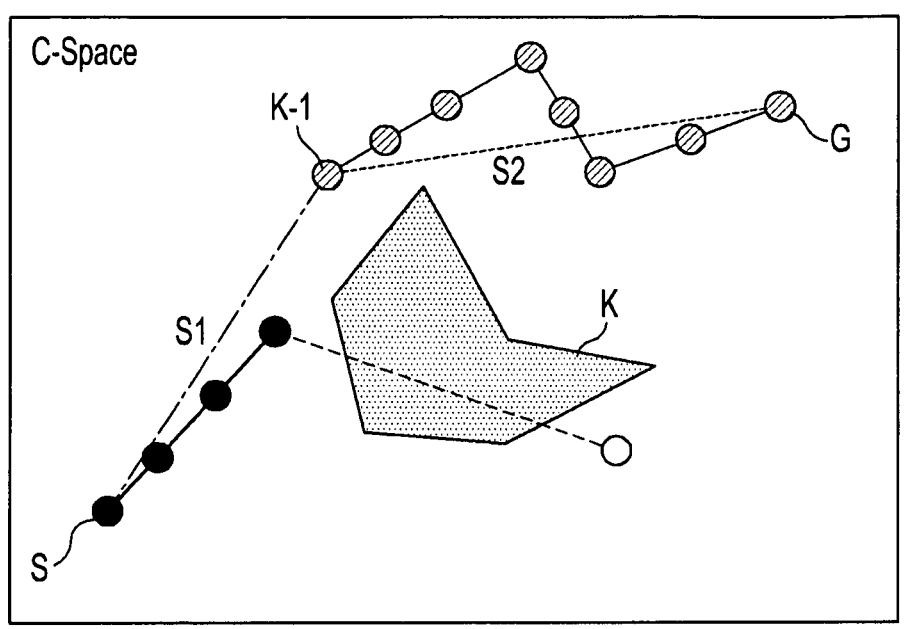

As shown in FIG. 31, even when the expansion of the tree in the second section S2 is finished, the tree is continuously expanded in the first section S1. FIG. 31 shows the case where the expansion of the tree is finished in the second section S2 and the tree is continuously expanded in the first section S1.

Figure 32:
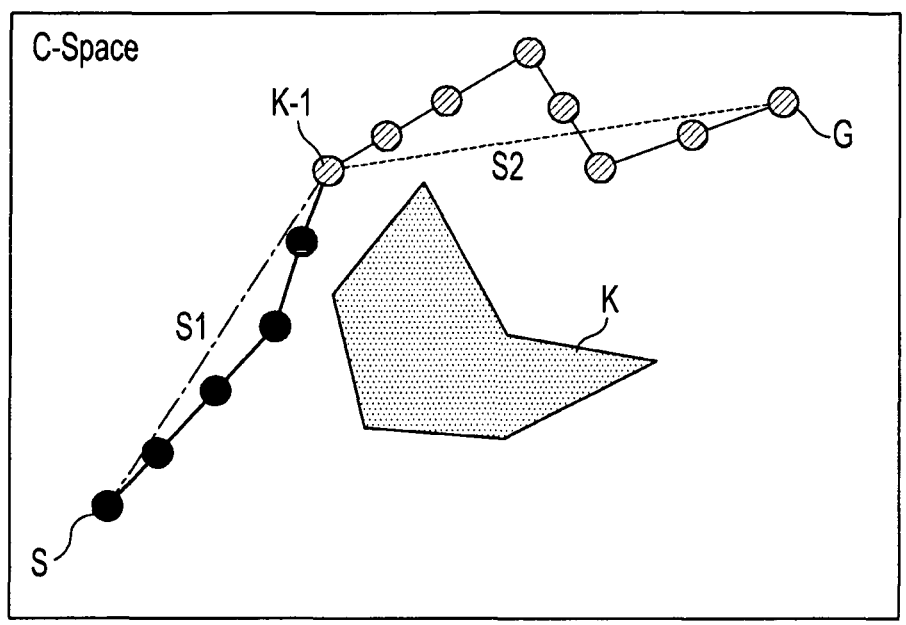
Figure 33:
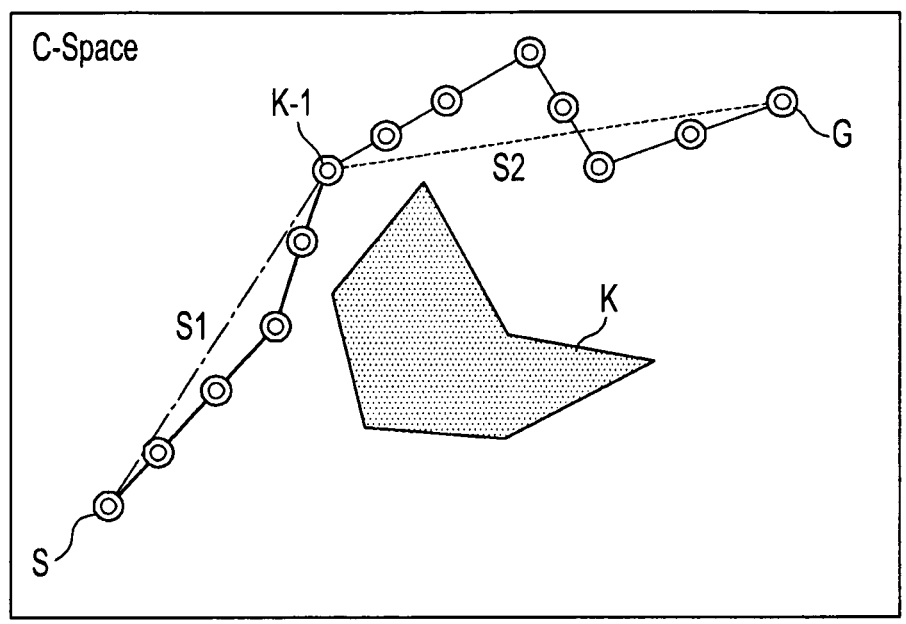

As shown in FIGS. 32 and 33, after the expansion of the tree is finished in the first section S1 and the second section S2, a final solution is searched for through graph search. FIG. 32 shows the case where the expansion of the tree is finished in the first section S1 and the second section S2 such that all the trees are completed. FIG. 33 shows the case where an overall path is formed through graph search.

Figure 34:
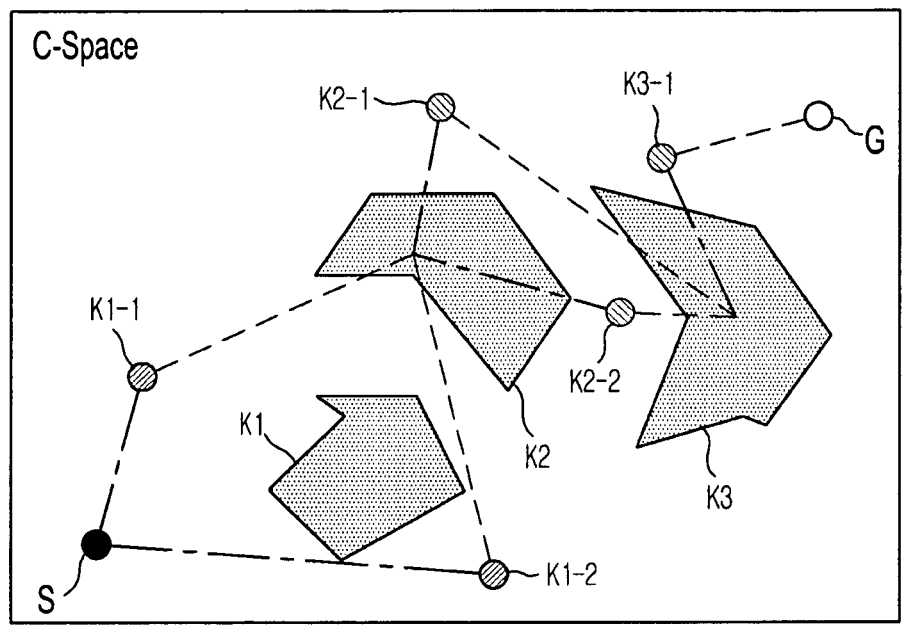

FIG. 34 shows a process of selecting waypoints if a plurality of obstacles is present between a start point and a goal point in a C-Space according to an embodiment of the present invention. As shown in FIG. 34, obstacles which are located within a predetermined angle α from a straight line connected between the start point S and the goal point G are recognized as intermediate points 1, 2 and 3 (K1, K2 and K3), and certain points K1-1 and K1-2, K2-1 and K2-2 and K3-1 separated from the recognized intermediate points 1, 2 and 3 (K1, K2 and K3) by predetermined distances are selected. It is to be noted that intermediate points 1, 2 and 3 representing obstacles K1, K2 and K3 are merely representative and the waypoints which are separated from intermediate points 1, 2 and 3 representing the obstacles by predetermined distances may be separated from any of a plurality of points on the obstacle in the C-Space. Thus, the intermediate points 1, 2 and 3 may be center points of the obstacles in the C-Space or may be points located at any position within the representations of the obstacles. A point where the start point S and the points K2-1 and K2-2 selected at the intermediate point 2 (K2) are viewed is selected as the waypoint of the points K1-1 and K1-2 selected at the intermediate point 1 (K1), a point where the points K1-1 and K1-2 selected at the intermediate point 1 (K1) and the point K3-1 selected at the intermediate point 3

(K3) are viewed is selected as the waypoint of the points K2-1 and K2-2 selected at the intermediate point 2 (K2), and a point where the points K2-1 and K2-2 selected at the intermediate point 2 (K2) and the target point G are viewed is selected as the waypoint of the point K3-1 selected at the intermediate point 3 (K3).

Figure 35:
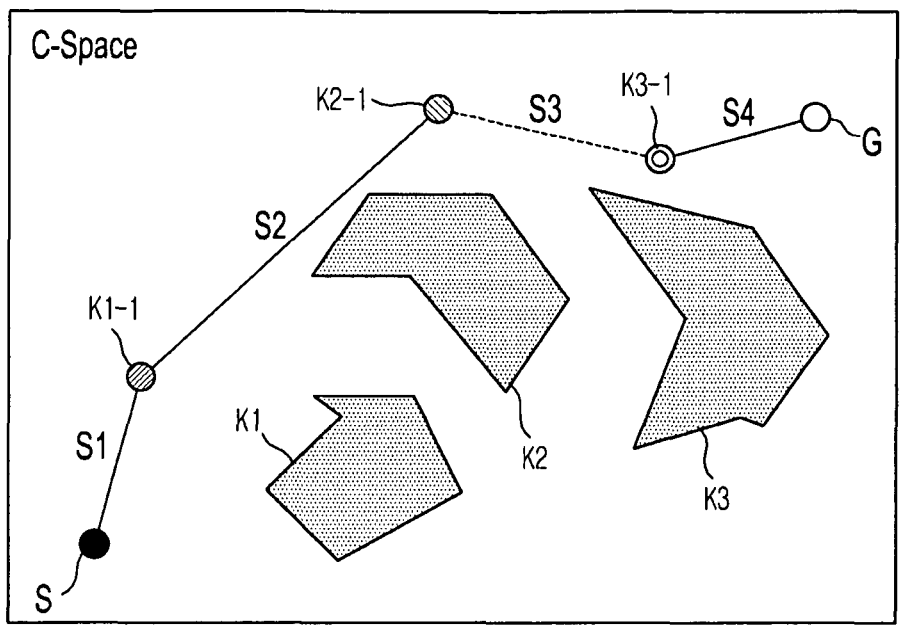

As shown in FIG. 35, the goal score condition is applied to the waypoints of the intermediate points K1, K2 and K3 so as to search for a waypoint having a smallest goal score. At this time, a section from the start point S to the goal point G may be divided into a first section S1 from the start point to a first waypoint K1-1, a second section S2 from the first waypoint K1-1 to a second waypoint K2-1, a third section S3 from the second waypoint K2-1 to a third waypoint K3-1, and a fourth section S4 from the third waypoint K3-1 to the goal point G. At this time, if it is assumed that the solution of inverse kinematics is present in the start point S, the second waypoint K2-1 and the third waypoint K3-1 of the first section S1, the second section S2 and the fourth section S4 denoted by a solid line and the solution of inverse kinematics is not present in the second waypoint K2-1 of the third section S3 denoted by a dotted line, the trees are simultaneously expanded in the first section S1, the second section S2 and the fourth section S4. In the third section, the tree is expanded after the expansion of the tree in the second section S2 is finished.

FIGS. 36 to 39 show the state in which the path is completed by expanding the tree in the third section S3 after the expansion of the trees in the first section S1, the second section S2 and the fourth section S4 is finished.

Figure 36:
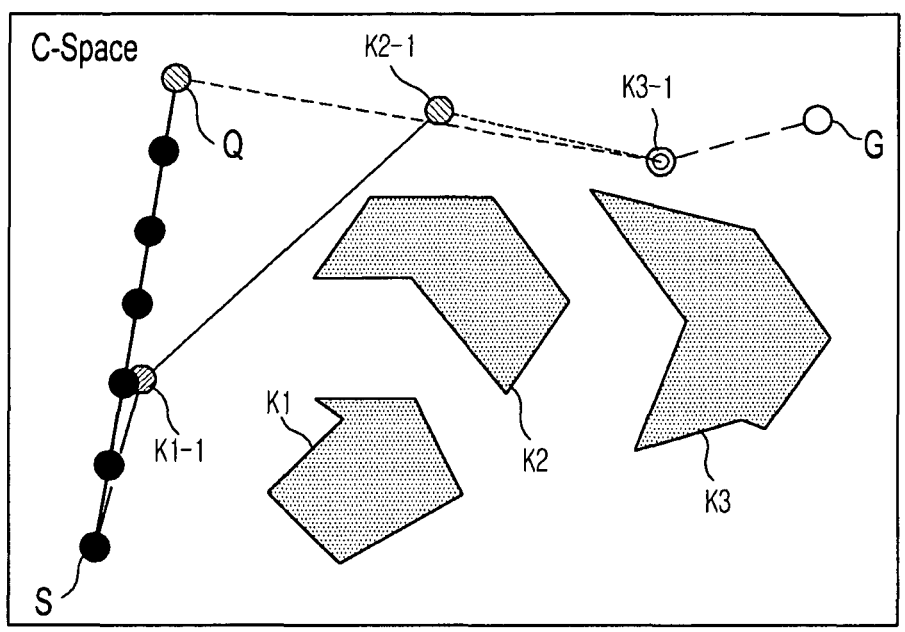

As shown in FIG. 36, the trees are simultaneously expanded in the first section S1, the second section S2 and the fourth section S4. At this time, if a certain point Q is used, since the goal score is decreased only in the first section S1 and the second section S2, the trees are simultaneously expanded only in the first section S1 and the second section S2.

Figure 37:
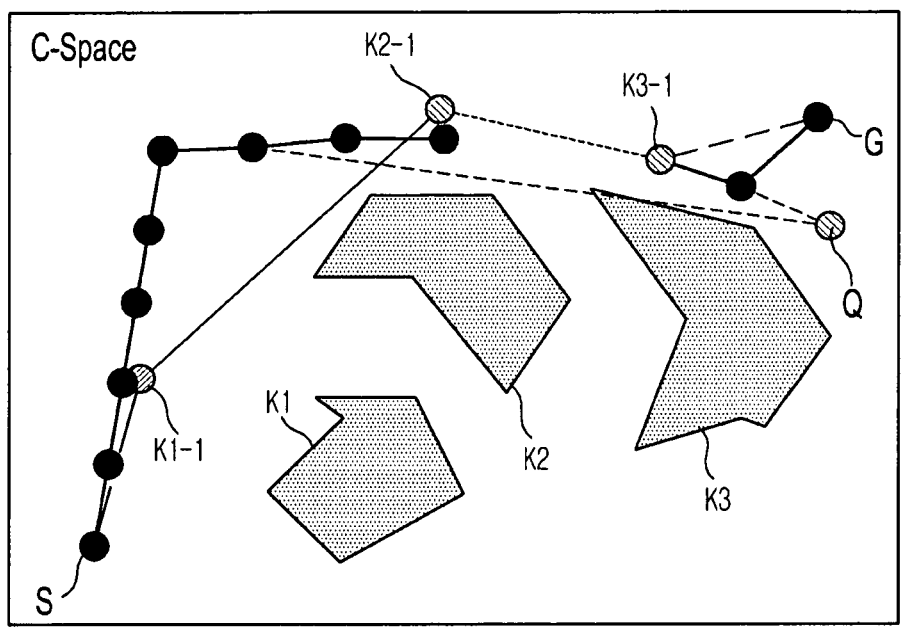

As shown in FIG. 37, after the simultaneous expansion of the trees in the first section S1 and the second section S2 is finished, the tree is expanded in the fourth section S4.

Figure 38:
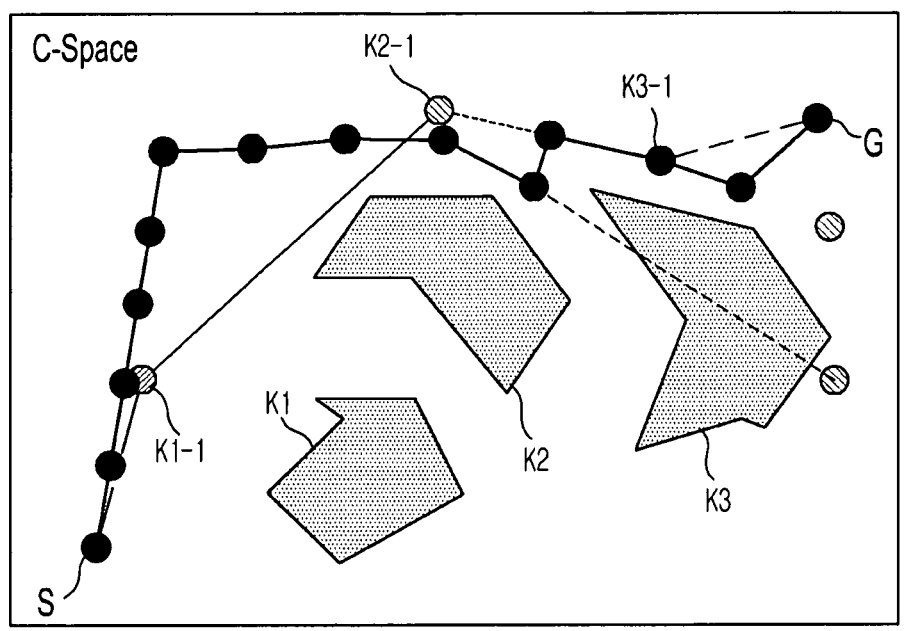

As shown in FIG. 38, after the expansion of the tree in the fourth section S4 is finished, the tree is expanded in the third section S3. At this time, the tree is expanded in a state in which the last node of the second section S2 is selected as an initial configuration.

Figure 39:
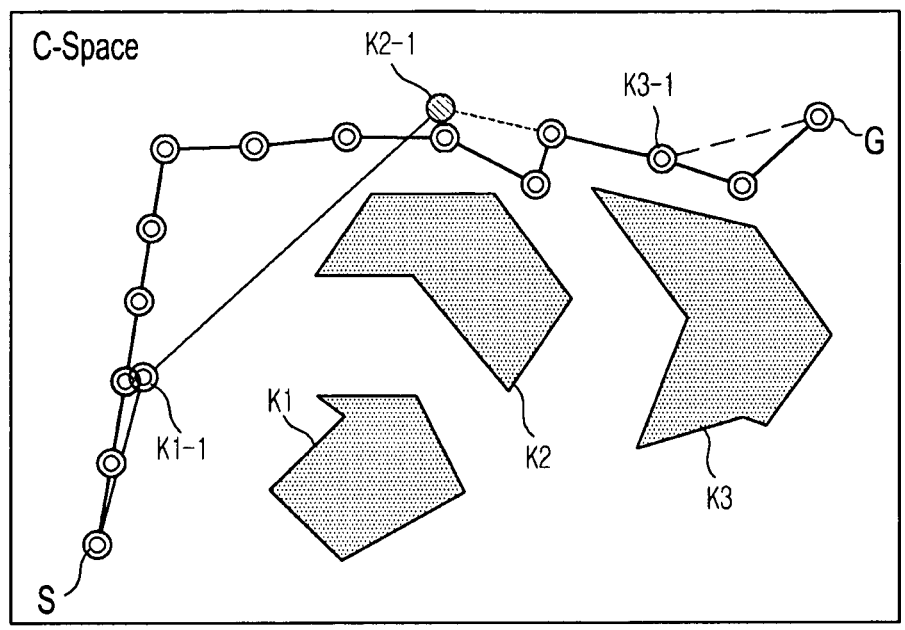

As shown in FIG. 39, if the solutions of all the sections are searched for, a final tree is formed using a graph search algorithm so as to complete the generation of the path.

Figure 40:
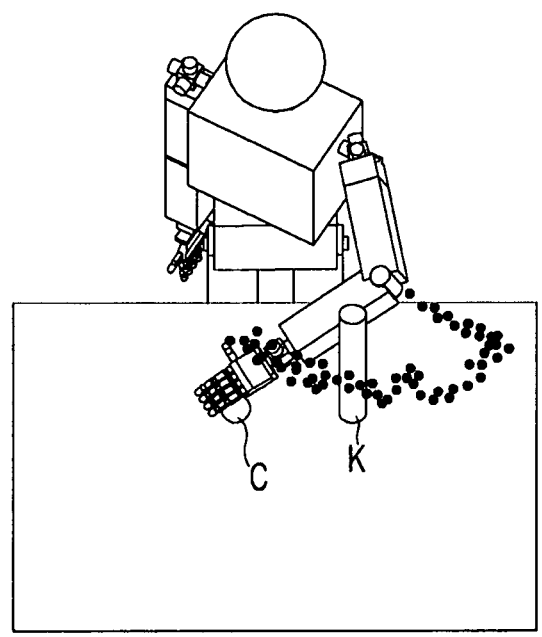
FIGS. 40 and 41 are views showing a simulation operation of a path plan according to an embodiment in a working space.
Figure 41:
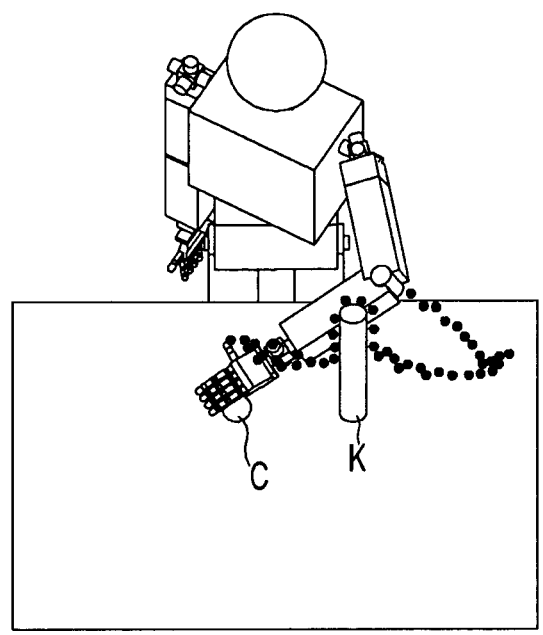

As shown in FIGS. 40 and 41, if the above-described method is not used as shown in FIG. 40 when the manipulator 130 grasps a ball C while avoiding a cylinder K corresponding to an obstacle, the manipulator 130 may not grasp the ball in a manner of passing the upper end of the cylinder K. However, if the above-described method is used, the manipulator 130 may pass the upper end of the cylinder K so as to grasp the ball. Therefore, a time consumed to grasp the ball may be shortened.

Figure 42:
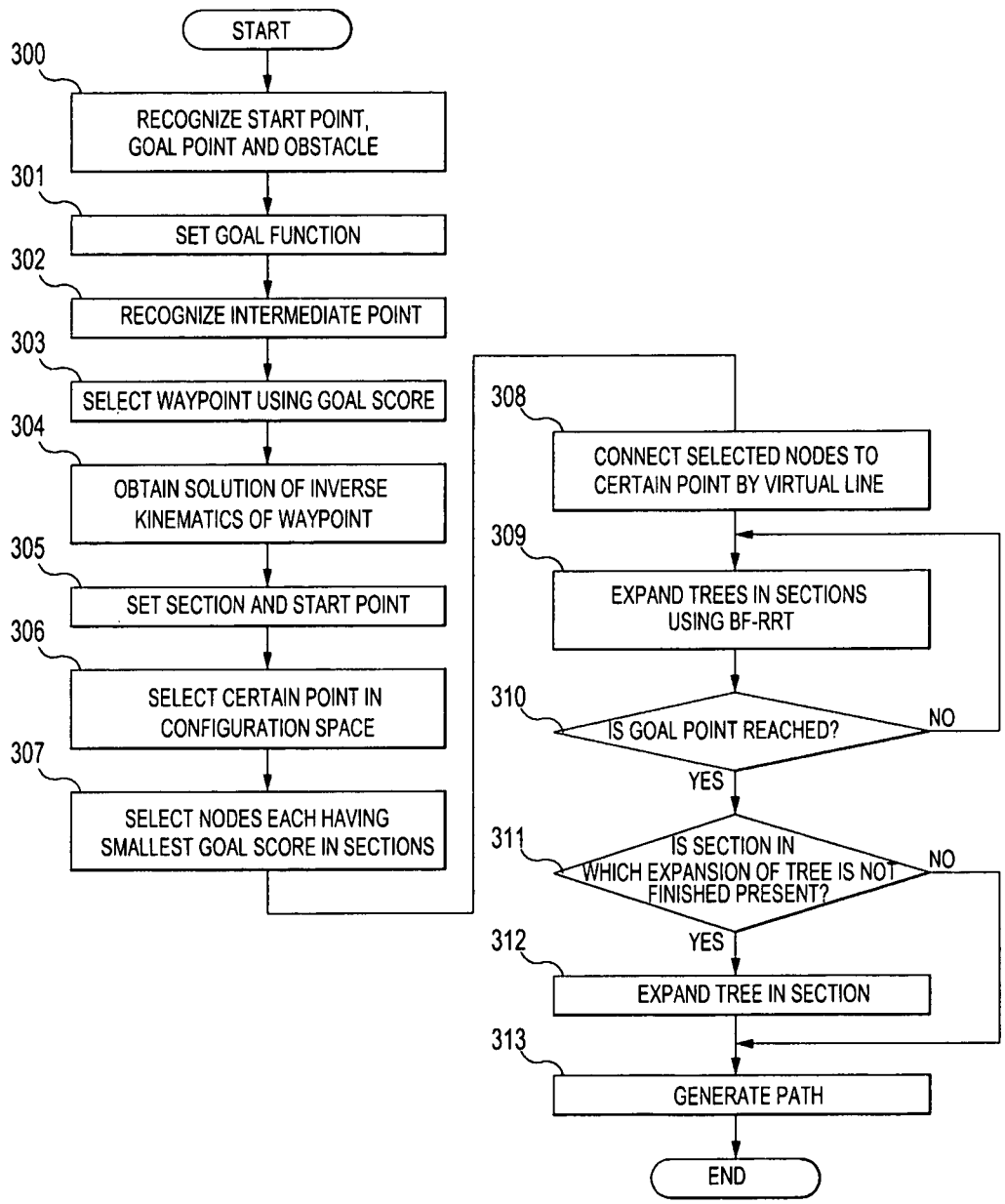
FIG. 42 is a flowchart illustrating a method of planning a path of a robot according to an embodiment.

FIG. 42 is a flowchart illustrating a method of planning a motion path of a robot according to an embodiment.

Referring to FIG. 42, the method of planning the path of the manipulator 130 of the robot includes recognizing information given when the manipulator 130 performs the task command, that is, the configuration (start point S) at the initial position of the manipulator 130 before performing the task command, the configuration (goal point G) at the goal position of the manipulator 130 where the task command may be performed, and the obstacle between the start point S and the goal point G in the C-Space (300); setting the goal function which is the function according to the distance and direction difference between the start point S and the goal point G (301); recognizing the obstacle within the predetermined angle α from the straight line connected between the start point S and the goal point G as the intermediate point K (302); selecting the plurality of waypoints K-1 and K-2 separated from the intermediate point K by the predetermined distances and selecting the point having the smallest goal score from the waypoints of the intermediate point as the final waypoint K-1 or K-2 (303); obtaining the solution of inverse kinematics of the selected final waypoint (304); dividing the section from the start point S to the goal point G into a plurality of sections using the selected final waypoint of the intermediate point and setting the start points of the divided sections depending on whether or not the solution of inverse kinematics is present (305); selecting a certain point in the C-Space (306); selecting nodes each having a smallest goal score in the sections (307); connecting the selected nodes to the certain point by a virtual line (308); simultaneously expanding the trees in the sections having the solution of inverse kinematics using the BF-RRT algorithm (309); determining whether the goal point is reached (310); determining whether there is a section in which the expansion of the tree is not finished (311); expanding the tree in the section in which the expansion of the tree is not finished (312); and generating a final tree so as to generate a path (313).

One or more of units/hardware described in the application may also be configured to act as one or more software modules in order to perform the operations of the above-described embodiments and may cause a general purpose computer or processor or a particular machine to perform any of the operations discussed above.

Aspects of the present at least one embodiment can also be embodied as computer-readable codes on a computer-readable medium. Also, codes and code segments to accomplish the present at least one embodiment can be easily construed by programmers skilled in the art to which the present invention pertains. The computer-readable medium may be a computer-readable storage medium, which is any data storage device that can store data which can be thereafter read by a computer system or computer code processing apparatus. Examples of the computer-readable storage medium include read-only memory (ROM), random-access memory (RAM), CD-ROMs, magnetic tapes, floppy disks, and optical data storage devices. The computer-readable medium can also be distributed over network-coupled computer systems so that the computer-readable code is stored and executed in a distributed fashion.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of planning a path of a robot, the robot including an user interface, a memory, one or more processors, a manipulator, and a driving unit, the method comprising:
  receiving a task command through the user interface;
  forming, by the one or more processors configured to execute computer-readable instructions stored in the memory, a configuration space to generate a motion path of the manipulator;
  recognizing, by the one or more processors, one or more obstacles between a start point and a goal point of the configuration space;
  identifying, by the one or more processors, each of the one or more obstacles as intermediate points, and for each intermediate point, selecting, by the one or more processors, a waypoint having a smallest goal score from a plurality of waypoints located at predetermined distances from the respective intermediate point;

dividing, by the one or more processors, a section from the start point to the goal point into a plurality of sections based on the selected one or more waypoints;

determining, by the one or more processors, whether a solution of inverse kinematics of the selected one or more waypoints is present;

simultaneously expanding, by the one or more processors, trees with respect to sections each having a selected waypoint with a solution of inverse kinematics, toward a randomly selected sample point;

expanding, by the one or more processors, a tree, after the simultaneous expansion of the trees is finished in the sections each having the waypoint with the solution of inverse kinematics, with respect to a section having a waypoint without a solution of inverse kinematics, to generate a search graph; and connecting, by the one or more processors, the start point and the goal point using the search graph to generate an optimal path to avoid the one or more obstacles, controlling, by the one or more processors, the driving unit to drive the manipulator to move along the generated optimal path wherein the generating the search graph includes randomly sampling at least one point in the configuration space, searching for a node having a smallest goal score, connecting the at least one sampled point with the node having the smallest goal score, expanding a tree such that the node reaches the goal point through the at least one waypoint, and generating the search graph, wherein the selecting a waypoint includes recognizing, using the one or more processors, one of the one or more obstacles located within a predetermined angle from a straight line connected between the start point and the goal point of the configuration space as at least one intermediate point, selecting certain points separated from the intermediate point by predetermined distances, respectively connecting the certain points to the start point and the goal point, and selecting one of the certain points, in which the one of the one or more obstacles is not present, as the waypoint, and wherein the node having the smallest goal score is selected from the tree using a goal function composed of a function of a distance from the goal point to an end-effector and a directional vector so as to expand the tree.

2. The method according to claim 1, wherein the start point is a node where a configuration at an initial position before the manipulator performs a task is formed in the configuration space.

3. The method according to claim 2, wherein the goal point is a node where a configuration at a goal position where the manipulator performs a task is formed in the configuration space.

4. An apparatus to plan a motion path of a robot, the apparatus comprising:
an user interface unit configured to for an user to input a task command;
a driving unit;
a manipulator;
a memory configured to store computer-readable instructions; and
one or more processors, in response to the task command and by executing computer-readable instructions, configured to,
  recognize a start point and a goal point respectively corresponding to an initial configuration and a goal configuration of a manipulator,
  recognize one or more obstacles located between the start point and the goal point,
  form a configuration space,
  identify the one or more obstacles located within a predetermined angle from a straight line connected between the start point and the goal point of the configuration space as intermediate points,
for each of the intermediate points,
  select a waypoint having a smallest goal score from a plurality of waypoints located at predetermined distances from a corresponding one of the intermediate points,
  divide a section from the start point to the goal point into a plurality of sections based on the selected waypoint,
  simultaneously expand trees with respect to sections each having a waypoint with a solution of inverse kinematics toward a randomly selected sample point, and
  expand a tree after the simultaneous expansion of the trees is finished in the sections each having the waypoint with the solution of inverse kinematics, with respect to a section having a waypoint without a solution of inverse kinematics, to generate a search graph, and to connect the start point and the goal point using the search graph to generate an optimal path to avoid the one or more obstacles, and
  control the driving unit to drive the manipulator to move along the optimal path,
wherein the one or more processors are further configured to,
  randomly sample at least one point in the configuration space, search for a node having a smallest goal score,
  connect the at least one sampled point with the node having the smallest goal score,
  expand a tree such that the node reaches the goal point through the at least one waypoint, and
  generate a search graph,
wherein the one or more processors are further configured to, for one of the intermediate points,
  select certain points separated from the one of the intermediate points by predetermined distances,
  respectively connect the certain points to the start point and the goal point, and
  select one of the certain points, in which the one or more obstacles are not present, as one of the at least one waypoint, and
wherein the one or more processors are further configured to select the node having the smallest goal score from the tree using a goal function composed of a function of a distance from the goal point to an end-effector and a directional vector so as to expand the tree.

* * * * *